United States Patent [19]
Wookey

[11] Patent Number: 6,151,683
[45] Date of Patent: Nov. 21, 2000

[54] REBUILDING COMPUTER STATES REMOTELY

[75] Inventor: Michael J. Wookey, Sunnyvale, Calif.

[73] Assignee: Sun Microsystems, Inc., Palo Alto, Calif.

[21] Appl. No.: 08/829,276

[22] Filed: Mar. 31, 1997

[51] Int. Cl.[7] .................................................. G06F 11/00
[52] U.S. Cl. .............................. 714/2; 714/15; 714/25; 714/26
[58] Field of Search ................... 395/182.02, 182.13, 395/182.19, 185.02, 185.03; 714/2, 15, 25, 11, 26; 370/221, 258, 222, 224, 452, 453; 707/501; 706/50, 59, 45

[56] References Cited

U.S. PATENT DOCUMENTS

| | | | |
|---|---|---|---|
| 4,567,560 | 1/1986 | Polis et al. | 364/184 |
| 4,637,013 | 1/1987 | Nakamura | 370/221 |
| 4,709,365 | 11/1987 | Beale et al. | 395/182.02 |
| 5,101,402 | 3/1992 | Chiu et al. | 709/224 |
| 5,155,847 | 10/1992 | Kirouac et al. | 395/200.51 |
| 5,299,312 | 3/1994 | Rocco, Jr. | 395/182.02 |
| 5,307,354 | 4/1994 | Cramer et al. | 395/182.02 |
| 5,400,246 | 3/1995 | Wilson et al. | 364/146 |
| 5,471,399 | 11/1995 | Tanaka et al. | 364/491 |
| 5,487,169 | 1/1996 | Vraney et al. | 395/700 |
| 5,491,791 | 2/1996 | Glowny et al. | 395/183.13 |
| 5,495,610 | 2/1996 | Shing et al. | 395/200.51 |
| 5,539,869 | 7/1996 | Spoto et al. | 345/336 |
| 5,600,796 | 2/1997 | Okamura et al. | 395/181 |
| 5,655,081 | 8/1997 | Bonnell et al. | 395/200.32 |
| 5,668,944 | 9/1997 | Berry | 395/184.01 |
| 5,696,486 | 12/1997 | Poliquin et al. | 395/200.54 |
| 5,699,505 | 12/1997 | Srinivasan | 714/10 |
| 5,726,912 | 3/1998 | Krall, Jr. et al. | 702/186 |
| 5,727,144 | 3/1998 | Brady et al. | 395/182.04 |
| 5,751,964 | 5/1998 | Ordanic et al. | 395/500.54 |
| 5,758,071 | 5/1998 | Burgess et al. | 395/200.5 |
| 5,825,944 | 10/1998 | Wang | 382/309 |
| 5,908,471 | 6/1999 | Lach et al. | 714/805 |
| 5,909,540 | 6/1999 | Carter et al. | 714/4 |
| 5,944,839 | 8/1999 | Isenberg | 714/26 |

OTHER PUBLICATIONS

"Remote Systems Diagnostics Installation & User Guide, Remote Systems Monitoring (SunReMon™), Remote Dial–in Analysis (SunRDA ™)," Release 1.0.1, Sun Microsystems, Mountain View, California, Nov. 1996, (116 pages).

"Solstice™ SyMON™ User's Guide," Revision A, Sun Microsystem Computer Company, Mountain View, California, May 1996 (116 pages).

*Primary Examiner*—Robert W. Beausoliel, Jr.
*Assistant Examiner*—Pierre Eddy Elisca
*Attorney, Agent, or Firm*—Skjerven Morill MacPherson, LLP

[57] ABSTRACT

A representation of the state of a computer, based on diagnostic data of the computer, is built by extracting system information from the diagnostic data and building a component based representation of the computer using the extracted system information. A static tree definition of a computer system is provided which is formed by element types in a fixed hierarchical relationship. A plurality of token types are provided, each of the token types being associated with one of the element types. The token types are component based data types. Respective segments of the incoming data that are defined by respective token types are identified and stored as tokens in a token data base. Each of the tokens has a value field holding a value associated with the element and a parent field referring to an element with which the token is associated. For each element in the static definition, the token data base is searched for associated tokens and a host state is built based on the static state definition and the extracted associated tokens, the elements of the static state definition being given value by their associated tokens.

29 Claims, 15 Drawing Sheets

- CRED Cache
- File Cache
- Streams Message
- Stream Head Cache
- Queue Cache
- SyncQ Cache
- Link Information Cache
- STREvent Cache
- Segment skip list cache
- anonymous cache
- anonymous map cache
- SegVN cache
- FLK Edges
- Snode Cache
- UFS Inode Cache
- FAS Cache
- PRNode Cache
- FNode Cache
- Pipe Cache
- RNode Cache
- RFS Proc control y2
- RFS Req control y2
- ACL Proc control y2
- ACL Req control y2
- ACL Proc Control y3
- ACL Req Control y3
- LM VNode
- LM Xprt
- LM sysid
- LM client
- LM async
- LM sleep
- LM config

*FIG. 7D*

| *Partition | Tag | Flags | Sector | Count | Sector | Mount Directory |
|---|---|---|---|---|---|---|
| c0t0d0s0 | 2 | 00 | 0 | 2048960 | 2048959 | / |
| c0t0d0s1 | 3 | 01 | 2048960 | 262960 | 2311919 | |
| c0t0d0s2 | 5 | 00 | 0 | 4154160 | 4154159 | |
| c0t0d0s7 | 8 | 00 | 2311920 | 1842240 | 4154159 | /export/home |

| *Partition | Tag | Flags | Sector | Count | Sector | Mount Directory |
|---|---|---|---|---|---|---|
| c0t1d0s0 | 2 | 00 | 0 | 62320 | 62319 | /c0t1d0s0.a005WN |
| c0t1d0s1 | 3 | 01 | 62320 | 197600 | 259913 | |
| c0t1d0s2 | 5 | 01 | 0 | 4154160 | 4154159 | |
| c0t1d0s0 | 4 | 00 | 259920 | 3894240 | 4154159 | /c0t1d0s6.a005WN |

FIG. 8

REBUILDING COMPUTER STATES REMOTELY

CROSS-REFERENCE TO RELATED APPLICATIONS

This application relates to the following commonly owned co-pending applications, Ser. No. 08/819,501, entitled "AUTOMATIC REMOTE COMPUTER MONITORING SYSTEM", by Michael J. Wookey, filed Mar. 17, 1997, and Ser. No. 08/819,500, entitled "DYNAMIC TEST UPDATE IN A REMOTE COMPUTER MONITORING SYSTEM", by Michael J. Wookey, filed Mar. 17, 1997, which applications are incorporated herein by reference.

BACKGROUND OF THE INVENTION

1. Field of the Invention

This invention relates to monitoring of computer systems and more particularly to rebuilding the state of a computer system based on diagnostic data from the computer system.

2. Description of the Related Art

Computer systems such as mainframes, minicomputers, workstations and personal computers, experience hardware and software failures that degrade system performance or render the system inoperative. In order to diagnose such failures computer systems include diagnostic capability which provides various types of system diagnostic information.

Computer systems are typically serviced when a failure is noticed either by system diagnostics or by users of the system when the system become partially or completely inoperative. Since computer systems are frequently located at some distance from the support engineers, when problems do occur, a support engineer may access the computer system remotely through a modem in an interactive manner to evaluate the state of the computer system. That remote dial-in approach does allow the support engineer to provide assistance to a remote customer without the delay of traveling to the computer system site. Once connected to the remote computer system, the support engineer can perform such tasks as analyzing hardware and software faults by checking patch status, analyzing message files, checking configurations of add-on hardware, unbundled software, and networking products, uploading patches to the customer system in emergency situations, helping with problematic installation of additional software, running on-line diagnostics to help analyze hardware failures, copying files to or from customer system as needed.

However, there are limitations to such support. For instance, the data size transfer may be limited at the time of failure, due to such factors as modem speed and thus a complete picture of a system may be unavailable. Running diagnostic software during the remote session, if necessary, may adversely impact system performance. Where a system is part of a network, which is commonplace today, the running of diagnostic tests may impact network performance. Where computer systems are being used in a production or other realtime environment, such degradation of system performance is obviously undesirable.

Further, historical data on system performance may not be available in such scenarios. It is therefore impossible to analyze trends or compare system performance, e.g., before and after a new hardware or software change was made to the system. The support engineer is limited to the snapshot of the system based on the diagnostic information available when the support engineer dials in to the system.

It would be advantageous if a support engineer had available complete diagnostic information rather than just a snapshot, However, system diagnostic tests typically generate a significant amount of data and it can be difficult for a support engineer to analyze such data in a raw form. Additionally, service centers typically support a number of different computer systems. Each computer system has its own hardware and software components and thus have unique problems. For example, it is not uncommon for failures to be caused by incorrect or incompatible configuration of the various hardware and/or software components of the particular system. It would be advantageous to provide a remote monitoring diagnostic system that could process, present and manipulate diagnostic data in a structured and organized form and also monitor a number of different computer systems without having prior knowledge of the particular hardware or software configuration of each system being monitored. In order to provide better diagnostic support to computer systems, it would also be advantageous to provide the ability to detect problems in the diagnostic data and to provide proactive monitoring of the diagnostic data in order to better detect and/or predict system problems.

SUMMARY OF THE INVENTION

Accordingly, the present invention provides a method and apparatus to build a representation of the state of a computer, based on diagnostic data, by extracting system information from that diagnostic data and building a component based representation of the computer using the extracted system information. A static tree definition of a computer system is provided which is formed by element types in a fixed hierarchical relationship. A plurality of token types are provided, each of the token types being associated with one of the element types. The token types are component based data types. Respective segments of the incoming data that are defined by respective token types are identified and stored as tokens in a token data base. Each of the tokens has a value field holding a value associated with the element and a parent field referring to an element with which the token is associated. For each element in the static definition, the token data base is searched for associated tokens and a host state is built based on the static state definition and the extracted associated tokens, the elements of the static state definition being realized and given value by their associated tokens.

The method and apparatus of the present invention provides a component based data structure for the diagnostic data that facilitates problem detection as well as proactive monitoring of the monitored computer system. Further, the present invention can build a representation of a monitored computer system without having any prior knowledge of the hardware and software details of the monitored computer system. The present invention also makes the diagnostic data easy to read and accessible to support engineers. Further, the invention can provide support for new computer systems and products in a manner that is more responsive than was previously available.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

FIG. 1b shows an exemplary monitored computer system which runs diagnostic tests on each computer and communicates the results of those tests to the system of FIG. 1a.

FIG. 7d shows operating system elements related to kernel statistics.

FIG. 8 shows an exemplary output of a diagnostic test from which tokens are extracted and used to instantiate the static model exemplified by FIGS. 3–6 and FIGS. 7a–7e.

DESCRIPTION OF THE PREFERRED EMBODIMENT(S)

Figure 1A:
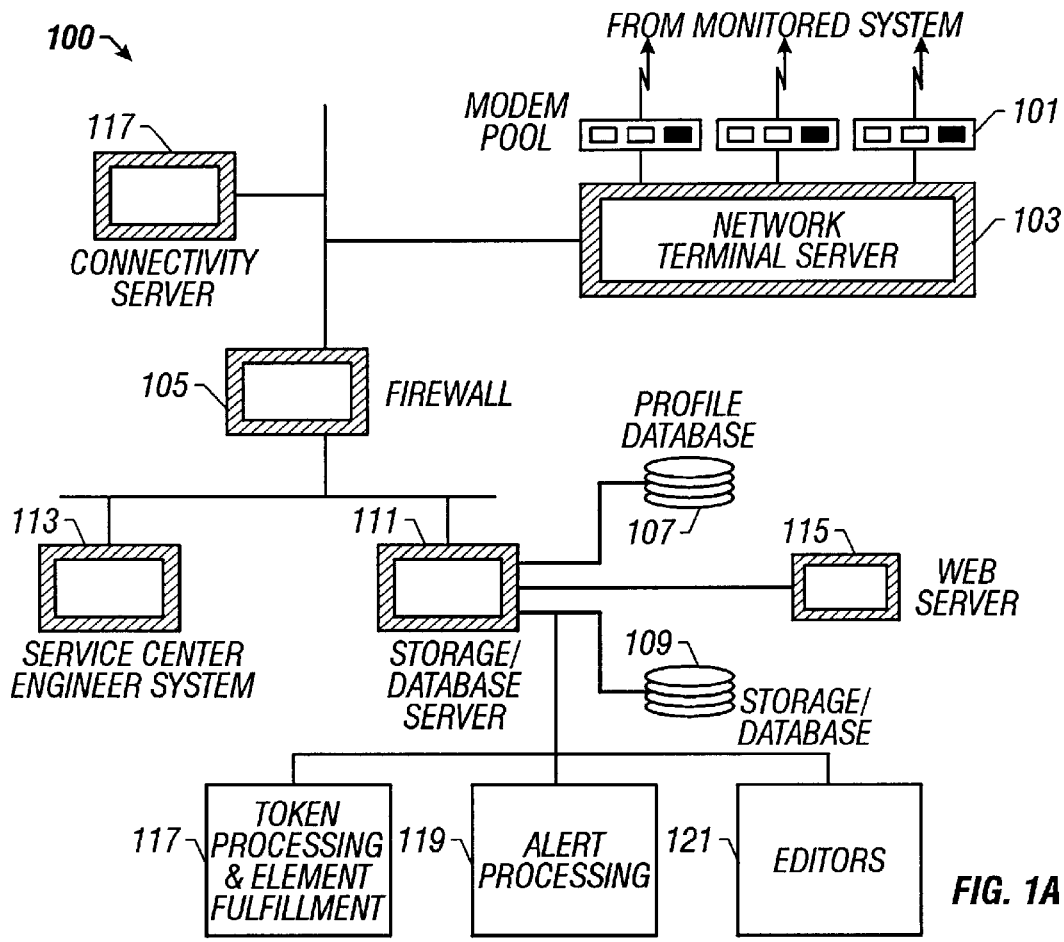
FIG. 1a shows an exemplary system for rebuilding the state of a computer according to the present invention.
Figure 1B:
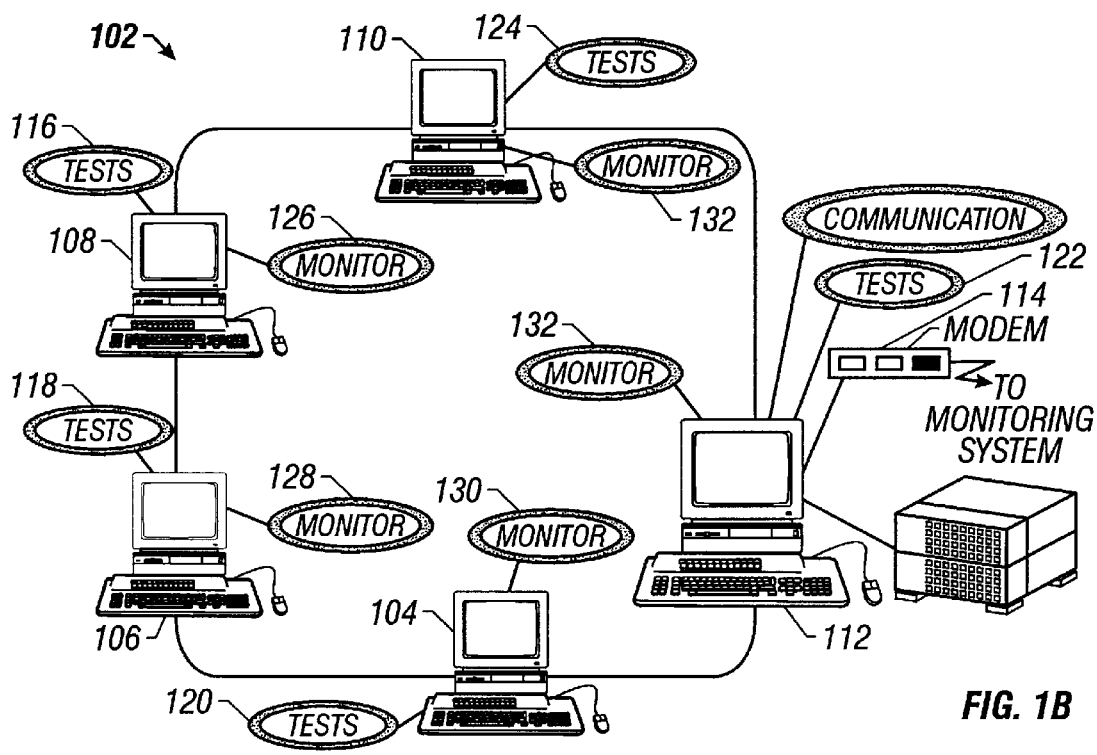

Referring to FIGS. 1a and 1b, an exemplary computer system 100, according to the present invention, receives diagnostic data from a monitored computer system 102. Monitored computer system 102 runs diagnostic tests, from among tests such as those shown in Table 1 or Table 2, on a periodic basis. The monitored system includes at least one computer and typically includes a plurality of computers 104–112 coupled in a network as shown in FIG. 1b. The diagnostic tests 116–124 are run on the computer system 102 under the control of monitor control software 126–134. The results of those diagnostic tests are automatically provided at periodic intervals to the computer system 100 which monitors computer system 102. In exemplary computer system 100, which includes one or more computers and associated storage areas, preferably coupled in a network, incoming diagnostic data from monitored system 102 is received from modem 114 at one of the modems in the modem pool 101. The incoming data may be received via email or may be a direct modem connection to the monitored system 102 or may be received via other communication channels. The raw diagnostic data is stored in storage 109. Storage 109 is shown as a single storage unit but may be separate storage units to accommodate the various storage requirements described herein. In order to perform operations on the data received, processor 117 transforms the received incoming data into a structure which can then be analyzed by alert processing computer 119. Editing capability is provided by a separate computer 121. Note that the functions may be performed in separate machines or may be combined into one or several computers.

TABLE 1

| Class | Test Name | Description |
|---|---|---|
| network | automount.files | Automount /etc Files |
| | automount.nis+ | Automount NIS+Files |
| | automount.nis | Automount NIS Files |
| | dfshares | NFS shared filesystems |
| | domainname | Domain name |
| | etc.defaultdomain | /etc/defaultdomain |
| | etc.defaultrouter | /etc/defaultrouter |
| | etc.dfstab | List /etc/dfs/dfstab |
| | etc.hostnames | /etc/hostname(s) |
| | etc.hosts | /etc/hosts |
| | etc.mnttab | List/etc/mnttab |
| | etc.named.boot | /etc/named.boot |
| | etc.nsswitch.conf | /etc/nsswitch.conf |
| | etc.resolv.conf | /etc/resolv.conf |
| | netstat-an | List all TCP connections |
| | netstat-in | List network interfaces |
| | netstat-k | Network interface low-level statistics |
| | netstat-m | List network routing |
| | nisdefaults | NIS+ server defaults |
| | nisstat | NIS+ statistics |
| | ypwhich | NIS server name |
| | ypwhich-m | NIS map information |
| OS | checkcore | Check for core files |
| | df | Disk Usage |
| | dmesg | Boot Messages |
| | framebuffer | Default console/framebuffer |
| | hostid | Numeric ID of host |
| | ifconfig | Ethernet/tP configuration |
| | messages | System messages (/var/adm/messages) |
| | patches | List system patches |
| | pkginfo | Software package information |
| | prtconf | System hardware configuration (Software Nodes) |
| | prtconf-p | System hardware configuration (PROM Nodes) |
| | prtdiag | Print diagnostics (Sun-4d systems only) |
| | sar | System activity reporter |
| | share | Shared directories |
| | showrev | Machine and software revision information |
| | swap | Swap report |
| | uptime | Local uptime and load average |
| | whatami | Lengthy system description report |
| unbundled | fddi-nf_stat | FDDI low-level statistics |
| | metastat | Online DiskSuite or Solstice DiskSuite |
| | vxprint | Systems using SPARCstorage Array Volume Manager |
| | x25_stat | X.25 low-level statistics |

TABLE 2

| Test Name | Test Name |
|---|---|
| ps -ef | ypwhich |
| pkginfo –1 | df |
| vmstat | df -k |
| showrev -a | mount -v |
| xdpyinfo | more/etc/dfs/dfstab |
| netstat -k | cachefsstat |
| kmemleak (SMCC) | df –1 |
| vtsprobe | df –1k |
| modinfo | showrev -p |
| arp -a | nettest -1V (VTS) |
| netstat -r | dmesg |
| conflgd | diskprobe |
| more/etc/mail/sendmail.cf | disktest –1v (VTS) |
| crontab –1 (as root) | tapetest –1v (VTS) |
| more/etc/nsswitch.conf | bpptest –1 v (VTS) |
| more/etc/resolv.conf | uname -a |
| niscat -o org_dir | |

Figures 2, 2A:
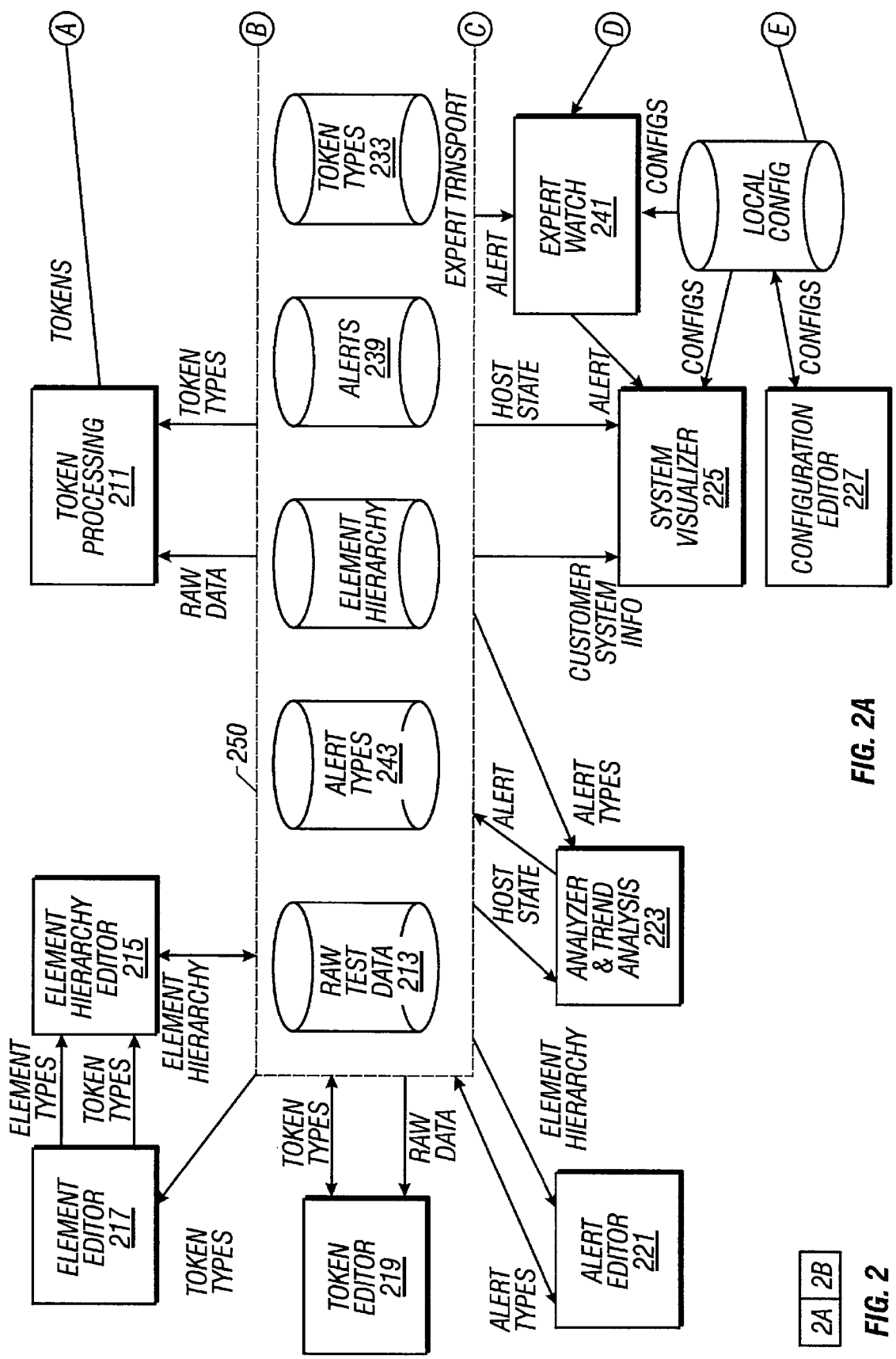
FIG. 2 details the architecture of a system that rebuilds computer states according to the present invention.
Figure 2B:
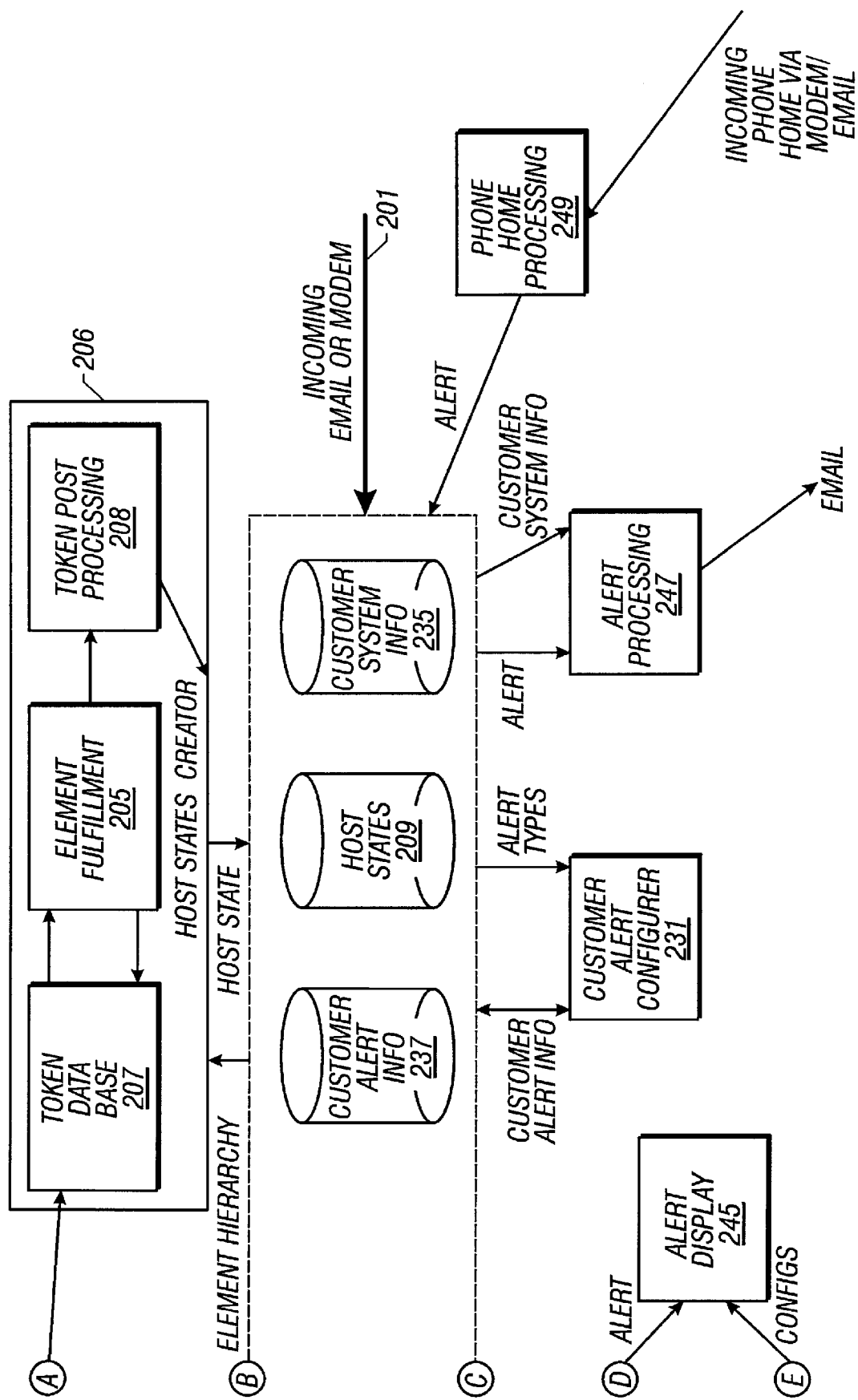

Referring to FIG. 2, the architecture of a system according to the present invention, is shown in greater detail. Incoming diagnostic data 201 is received via email or direct modem link (or another communication link) into the monitoring system and stored in raw test data storage area 213. The test data, which contains information about the software and hardware components in monitored system 102, is processed by token processing 211 to extract the information associated with hardware and software components in the monitored system. The extracted information is then used to create a representation of the monitored system in host state creator 206 based on the component information. The host state is the state of the monitored system or one computer of the monitored system over the particular time period that the diagnostic tests were run. Further details of the host state will be described further herein.

In order to create a representation of the monitored system, the components contained in the test data are rebuilt into a system hierarchy based on a static hierarchy tree definition. In a preferred embodiment, one static hierarchy tree definition is applicable to all systems which are being monitored. The extracted information about the components in the monitored system are mapped onto the static tree to create the system representation for the monitored system. Thus, the state of the monitored system is rebuilt.

The hierarchy tree is composed of elements. An element can be thought of as a physical or virtual component of a computer system. For example, a computer system may include such components as a disk, a disk partition, a software package, and a patch. An element has tokens associated with it. Thus, a partition element may have a disk percentage token, disk name token, and space available token associated with it. An element definition includes what token types fulfill the element, and give the element value. In one embodiment, an element is an instance of a class of element types as implemented in an object oriented language such as Java.

Figure 3:
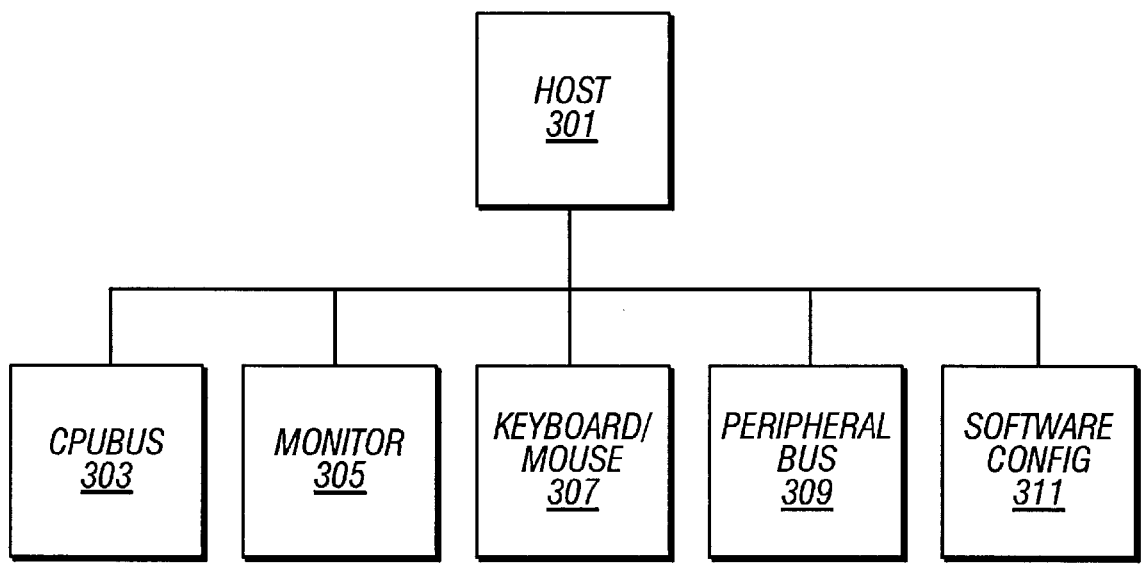
FIG. 3 shows a root and lower branches of a static tree definition of computer system.
Figure 4:
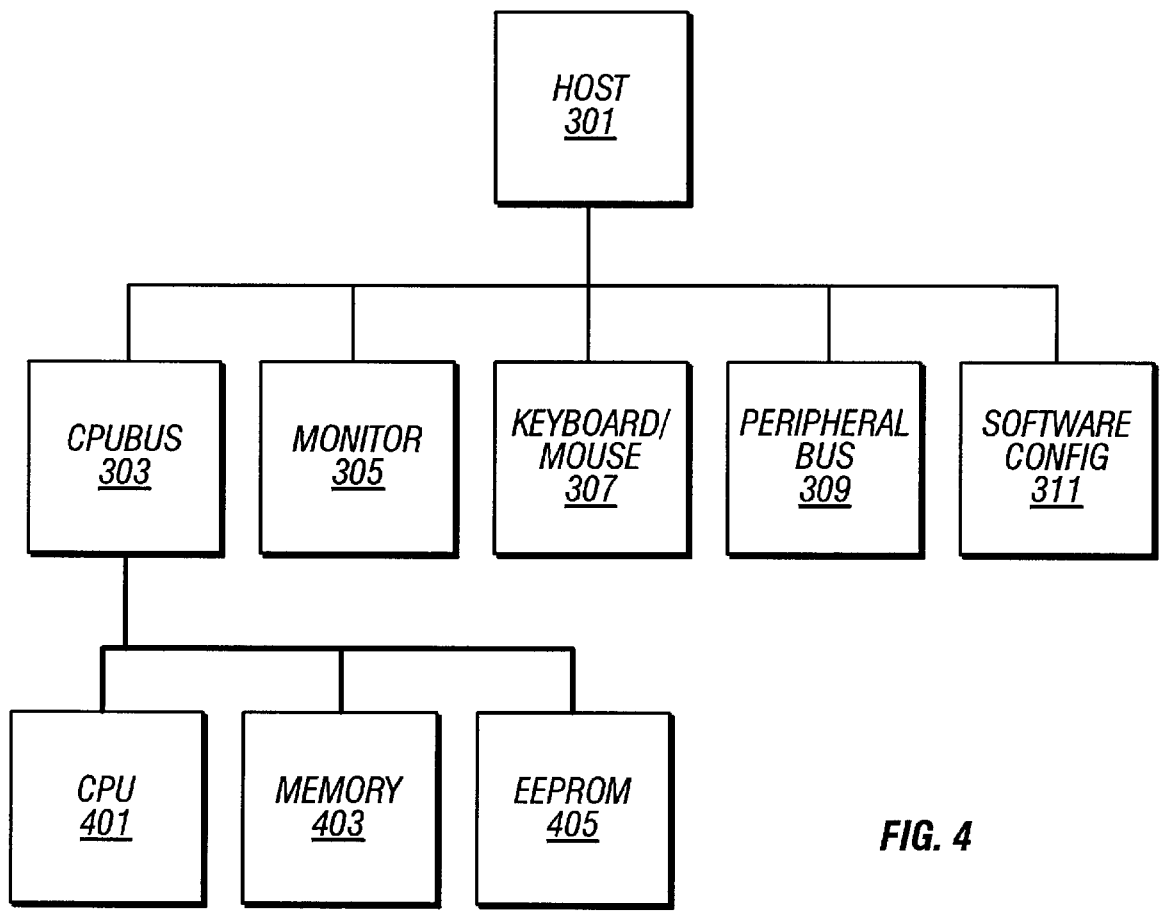
FIG. 4 shows additional branches of a static tree definition of a computer system related to components on the CPU-BUS.
Figure 5:
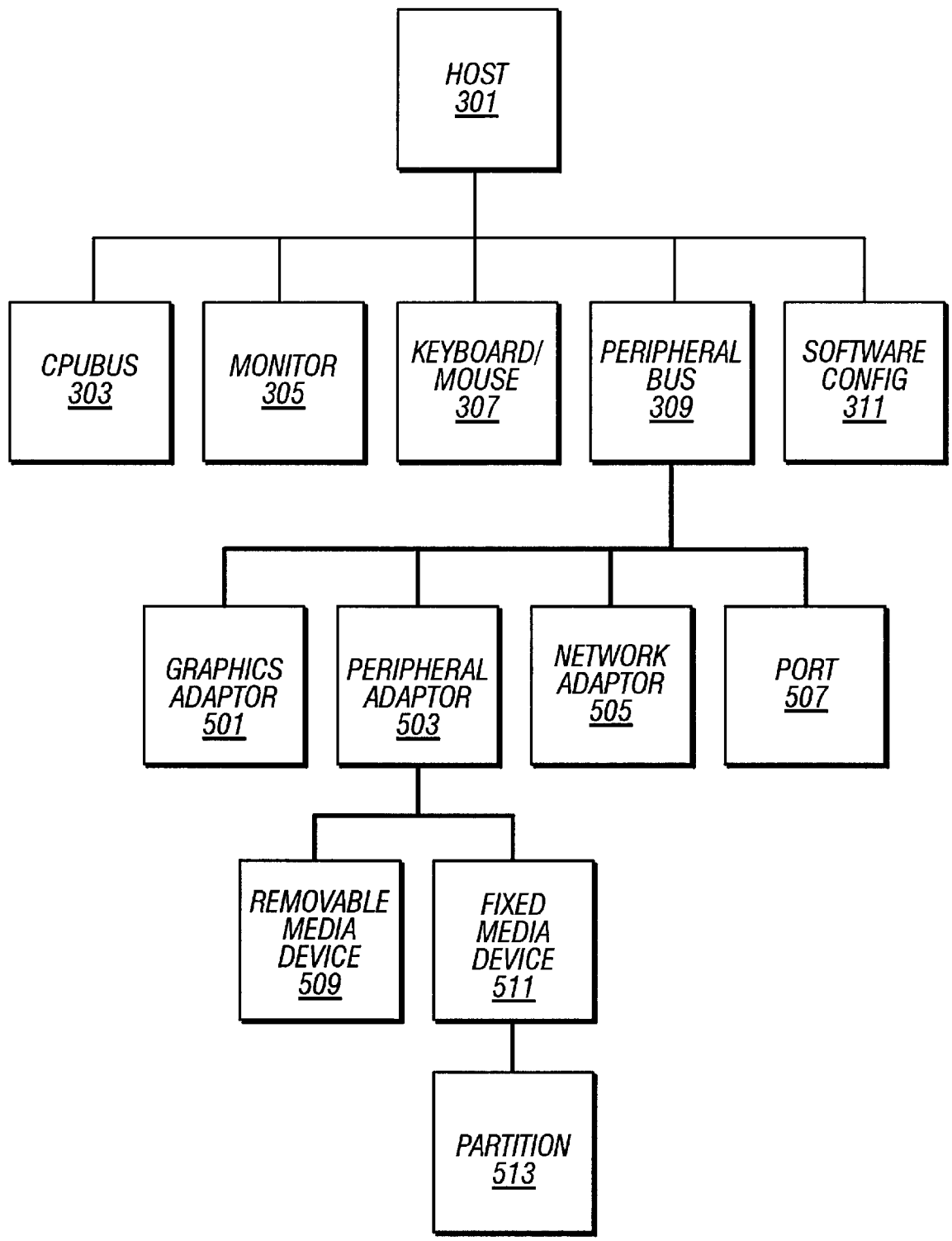
FIG. 5 shows additional branches of a static tree definition of a computer system, related to components on the peripheral bus.
Figure 6:
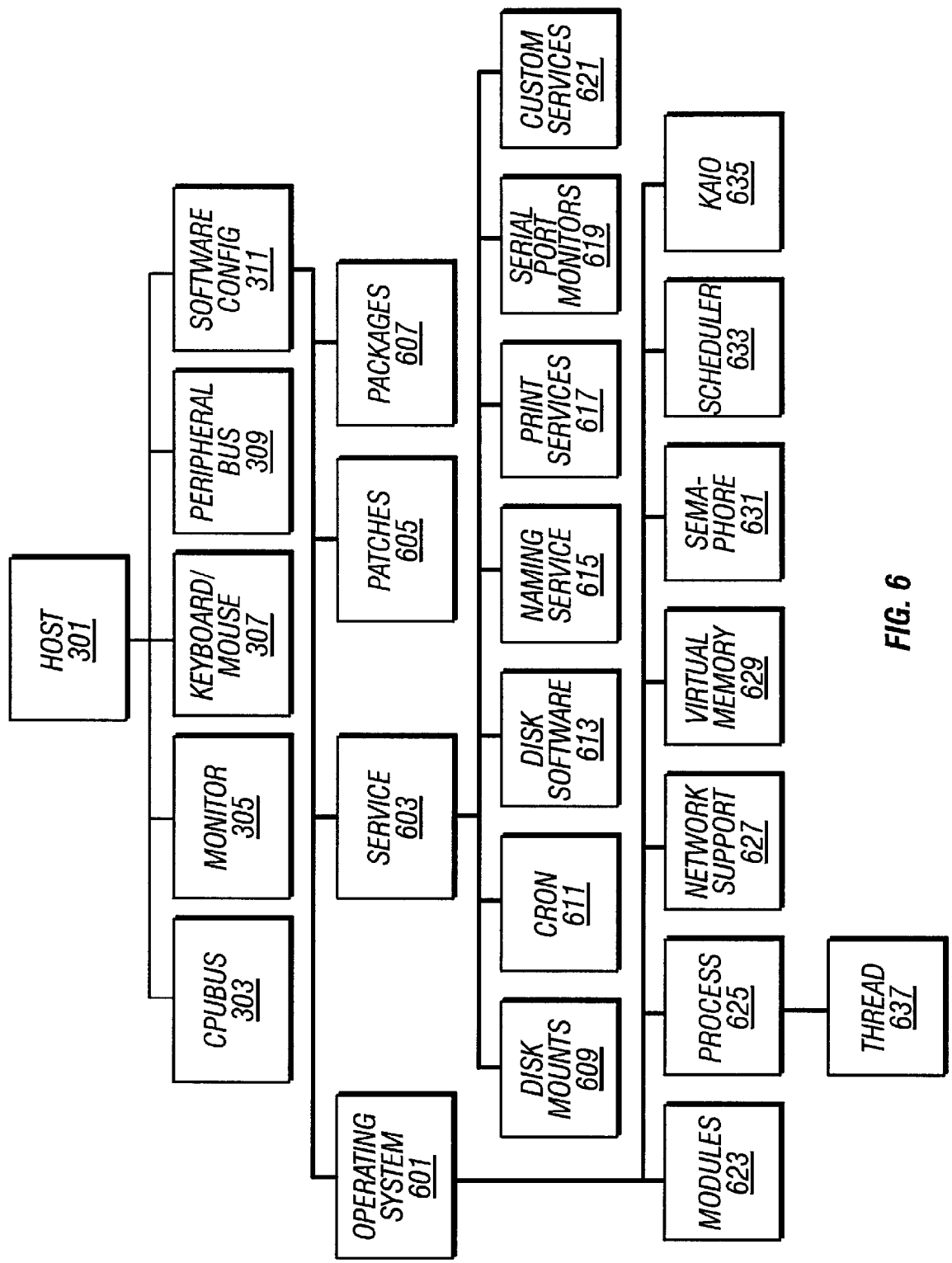
FIG. 6 shows additional branches of a static tree definition of a computer system, related to software configuration components.
Figure 7A:
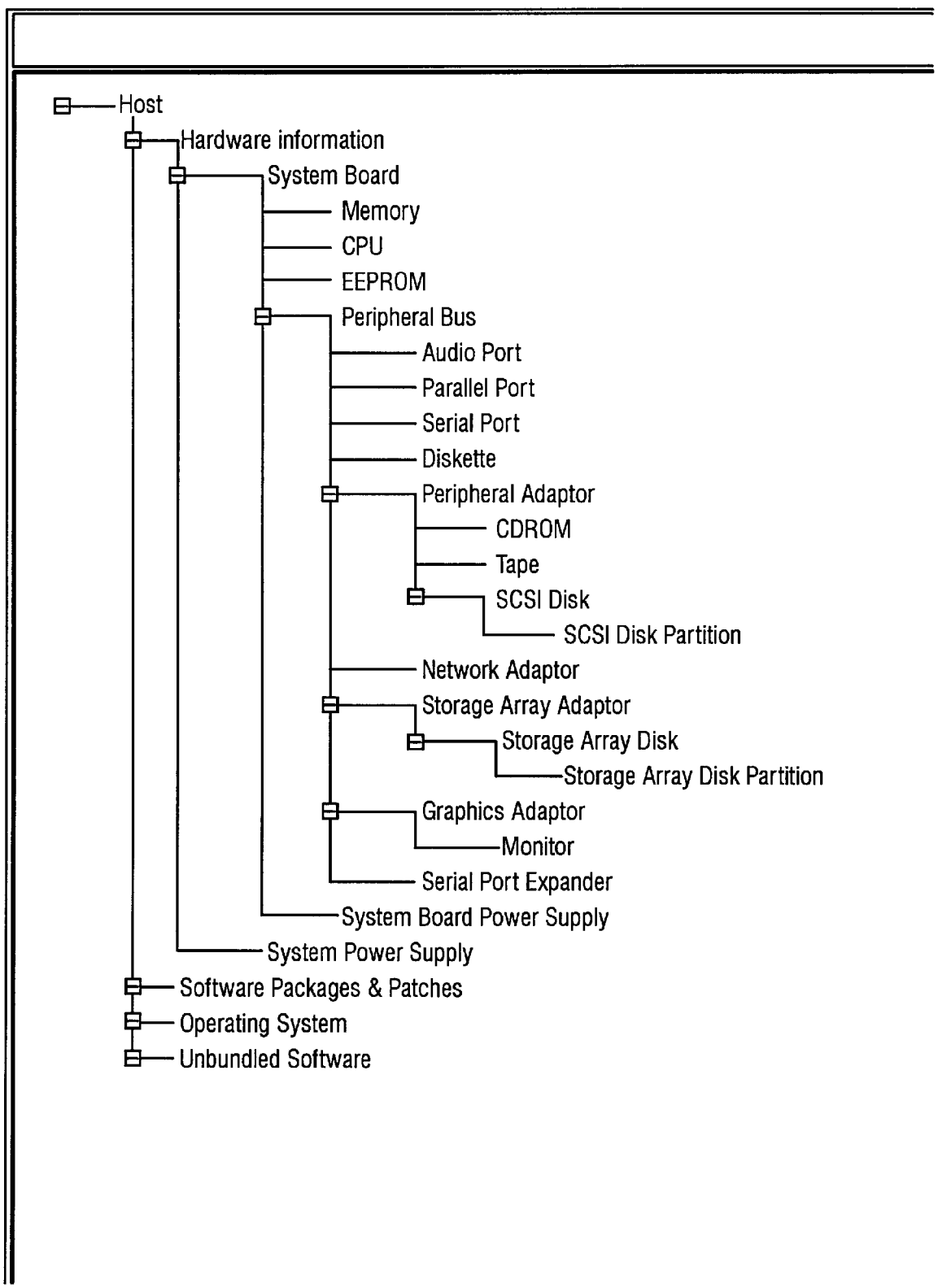
FIG. 7a shows the root and lower branches of a second exemplary tree structure.
Figure 7B:
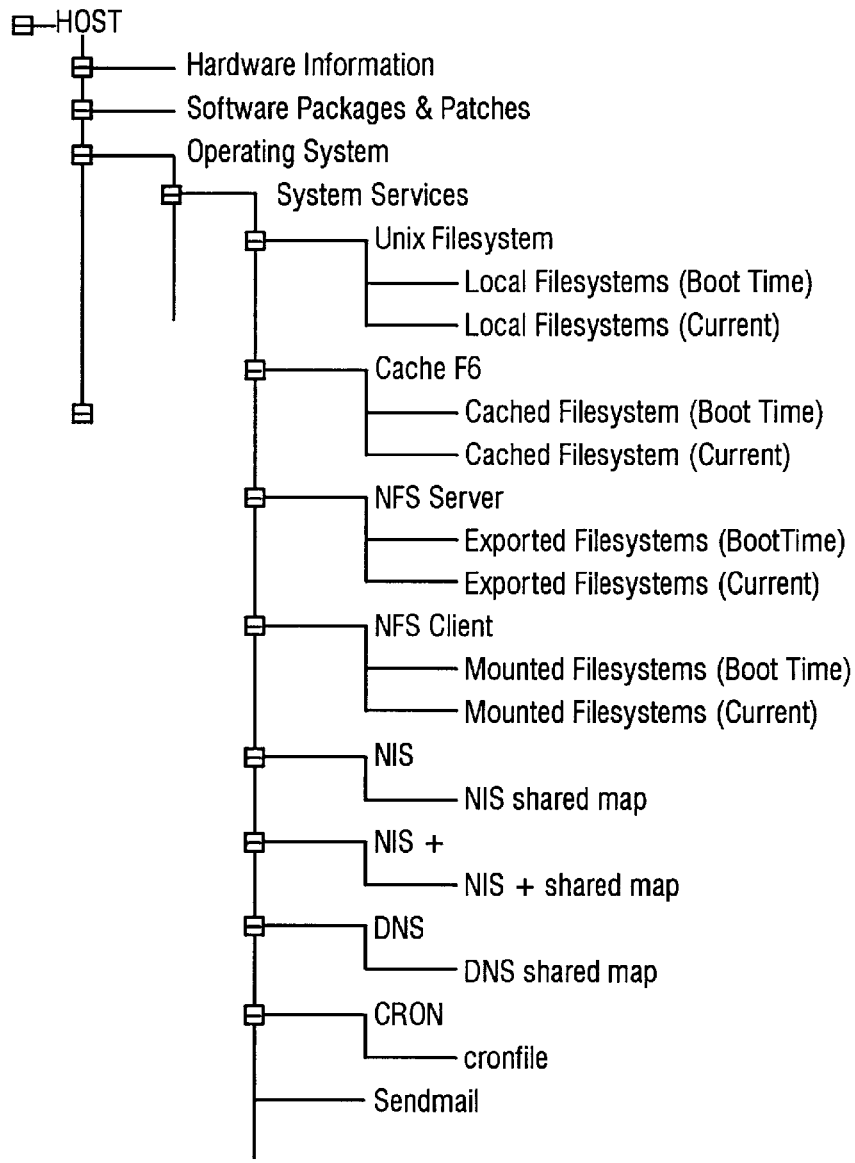
FIG. 7b shows additional sub elements of the System services element.
Figure 7C:
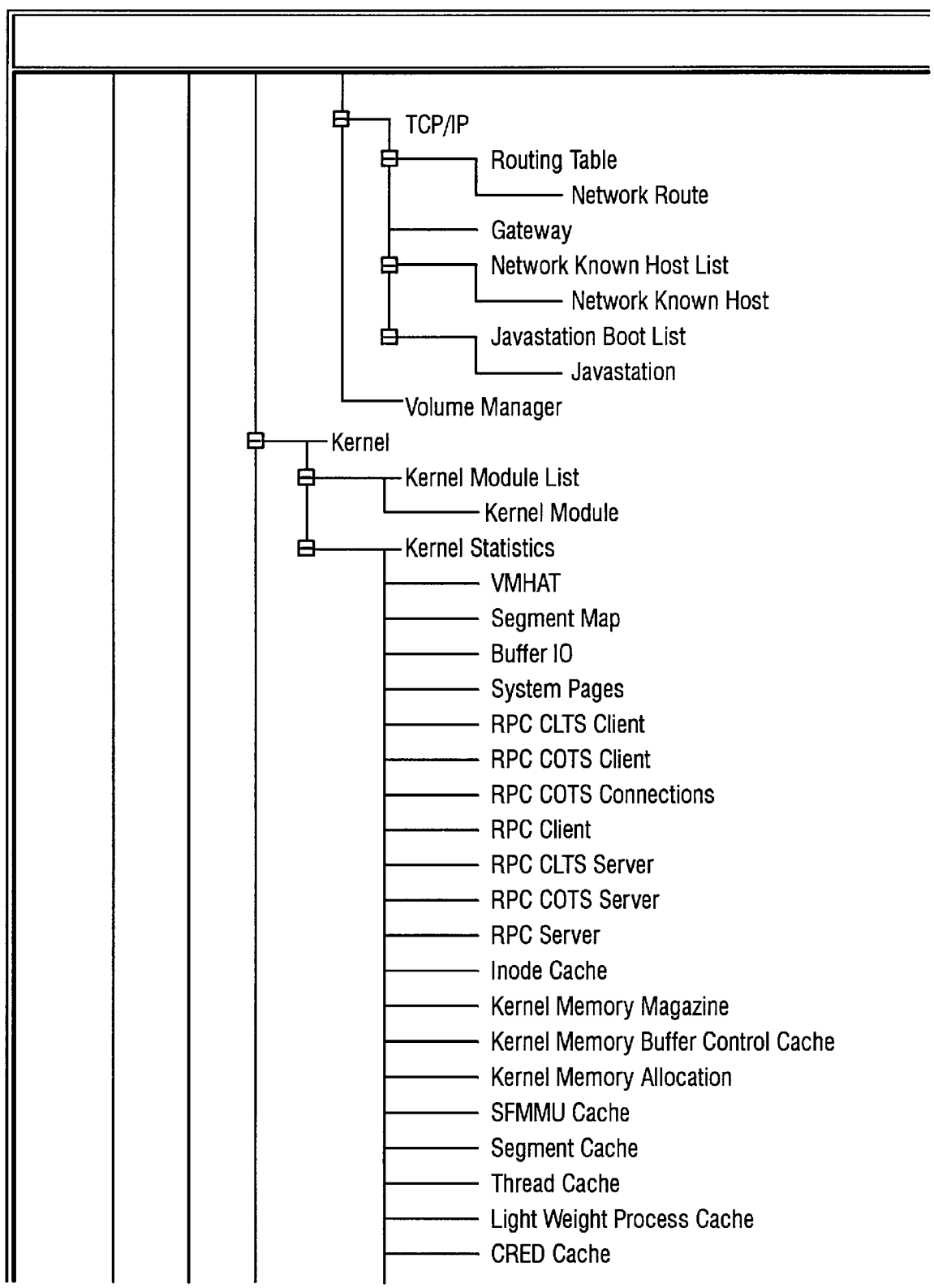
FIG. 7c shows additional operating system elements.
Figure 7E:
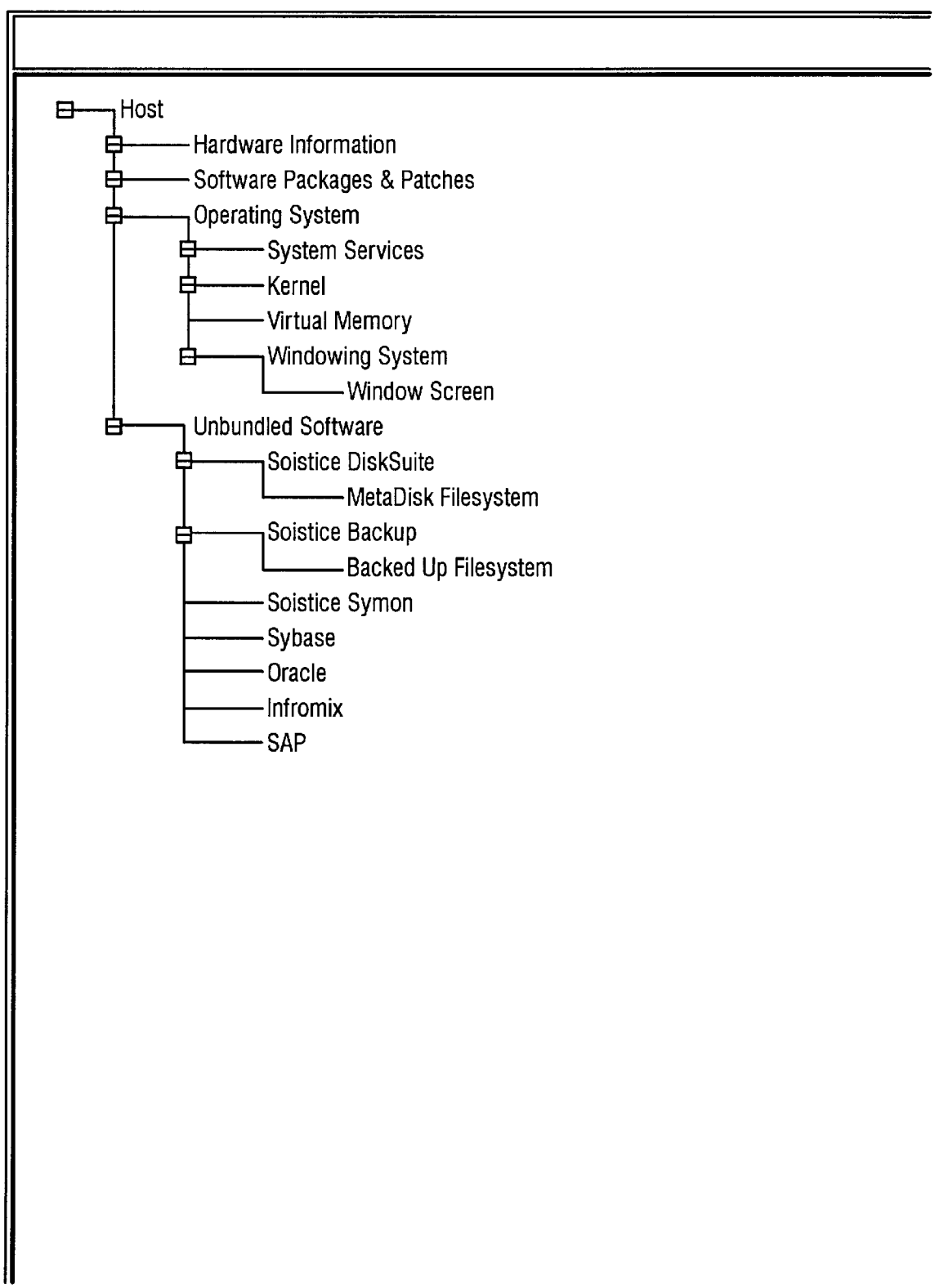
FIG. 7e shows unbundled software elements.

An exemplary portion of a static tree definition a computer system is shown in FIGS. 3–6. FIG. 3 shows a lower level (closer to the root) elements of the static tree and FIGS. 4, 5 and 6 show how the tree definition expands. The element host 301 defines the kind of computer that is being monitored. For instance, the host may be a workstation running Solaris or a PC running Windows NT. Attached to host 301 are other physical or virtual components such as CPU bus 303, monitor 305, keyboard/mouse 307, peripheral bus 309 and software configuration 311. Note that the terms are very general. Each element represents types of components that can be found in a typical computer system.

Referring to FIG. 4, the computer system further includes additional physical or virtual components on the CPU bus 303. The additional elements found on the CPU bus include CPU 401, memory 403 and EEProm 405. Referring to FIG. 5, additional components of the static hierarchy tree definition of the computer system can be found under peripheral bus element 309. Note that the instance of the peripheral bus could be an Sbus. However, the instance could also be a Peripheral Component Interface (PCI) bus. In fact there could be two instances of peripheral bus, SBUS and CPI bus. In some instances there could be more than two peripheral buses. The additional elements found on peripheral bus 309 include display adapter 501, peripheral adapter 503, network adapter 505 and port 507. The peripheral adapter element 503 may be coupled to additional elements such as removable media device element 509, (e.g., a disk drive, tape or CD drive) or a fixed media device 511. The fixed media device may be a hard disk drive which can have a further virtual component, partition element 513. Note the general nature of the static hierarchy system definition. That allows the static definition to be used even for monitored systems that utilize different software and hardware components.

Referring to FIG. 6, additional software elements under the software configuration element 311 are shown. Included in the software configuration 311 are the operating system element 601, software services element 603, patches element 605 and packages element 607. Additional elements under software services include disk mounts 609, cron 611, disk software 613, naming services 615, print services 617, serial port monitors 619 and custom services 621. The packages element 607 indicate, e.g., what software has been installed on the system. The operating system 601 is further defined by elements 623–637.

The description of the static tree is exemplary. Another tree may be chosen according to the system being monitored. Additionally, the static tree may be modified to reflect hardware and software enhancements to computer systems. The hierarchy tree definition is static in that it does not vary according to the system being monitored. However, the hierarchy tree can be edited in element hierarchy editor 215 to accommodate additions and/or deletions from the hierarchy tree when for instance, a new technology begins to be utilized in the monitored computer systems. One static tree or hierarchy tree definition may be sufficient for most or all monitored systems. However, a hierarchy tree definition could be tailored to the type of computer system that is being monitored to e.g., enhance processing speed. Another exemplary tree structure is shown in FIG. 7a–7e. The tree structure can be seen to include both hardware components and software components.

Thus, given a static definition of a generic computer system such as shown in FIGS. 3–6, or FIGS. 7a–7e, it is possible to build a representation of the actual computer system being monitored utilizing the diagnostic data communicated from the monitored system to the monitoring system.

In order to extract information from the diagnostic data stream, "token types" are utilized. A token type defines each token to have a token name and a test name. A test name comes from the tests shown e.g., in Table 1 or in Table 2, and indicates which test output contains the information for the token. In addition to a token name and a test name, each token has a label and a value. The label for the token gives the token knowledge about what element the token is associated with, i.e., the parent of the token which is an element. The value of the token provides a value extracted from the diagnostic data that gives value to the element.

For instance, assume a disk element exists with a name of "c0t10d0". Assume also that a token exists for such a disk element indicating the number of sectors per cylinder. The name of such a token would be, e.g., "number of sectors per cylinder." The test name in the token would be "vtsprobe" since the output of that test provides the information needed for the number of sectors per cylinder. The label for the token would be "c0t10d0" indicating that token is associated with a particular disk having that name. Finally, the token would have a value which indicates the number of sectors per cylinder. Other tokens could of course be associated with that element. For example, another token associated with that disk element might be a disk manufacturer token that identifies the manufacturer as "Seagate". The value of the token in such an instance would be "Seagate".

Note that one token type can create many tokens from the test data. For example, a "disk name" token type could extract multiple tokens, e.g. the disk names "c0t1d0" and "c0t2d0", from the test data when a particular system has two disks so named.

There are two types of tokens. The first is an element realizing token. Element realizing tokens provide a way to determine whether an element should be included when building a particular host state. For example, a disk name token is an element realizing token. The second type of token are data tokens which provide additional information about an element that has already been realized, such as the token indicating the number of sector per cylinder. Thus, it can be seen that tokens give value to the elements.

For any particular system, it is preferable to create tokens with as much granularity as possible. Thus, the smallest piece of information that is available about a system from the available diagnostic tests should be included as a token. Representative tokens are included in the description herein. The exact nature of the tokens and the total number of tokens will depend upon the system that is being monitored, including its hardware and operating system, and the diagnostic tests that can be run on the system. Table 3, attached, shows both elements and tokens for an exemplary embodiment of the invention. For each element shown in Table 3, the associated tokens are shown as well as the tests that supply the token information. In addition Table 3 shows the types of computers and operating system releases on which the tests are operable.

An exemplary output of one the diagnostic tests is shown in FIG. 8. The processing must extract from the output such information as the disk partition ID, last sector, first sector and the like. Examples of the tokens that are extracted for disk partition elements is shown in Table 3 for tokens associated with "SCSI Disk Partition Element". In order to parse through the output of the diagnostic tests a strong textual processing programming language, such as Perl, is utilized.

Note that the preferred implementation of the invention described herein is in an object oriented computer language and more particularly in Java. Nearly all the classes and type definitions described herein extend the type Persistent Object. Persistence is a technique that can be used in object oriented programming to ensure that all memory resident information can be stored to disk at any time. It can be thought of as encoding and decoding. When a persistent object is saved to disk, it is encoded in some manner so that it may be efficiently stored in the appropriate medium. Equally when loading the information back, it is decoded. That allows complex memory structures to be stored easily in databases with minimum disk space impact.

Now that it is understood that a static tree structure is composed of elements which are realized and given value by tokens, the building of a particular representation of a monitored computer system can be more completely described. Referring again to FIG. 2, the incoming data stream 201 of diagnostic data is stored in raw test data storage area 213. Token types are stored in storage area 233. The token types and the diagnostic data are provided to token processing 211, which is the process of running the token definitions against the incoming data and generating an outgoing stream of tokens which are stored in token data base 207. In a preferred embodiment the tokens in token data base 207 are stored as a hashtable to provide faster access to subsequent processing steps of building the representation of the system. A hashtable is a common key/element pair storage mechanism. Thus, for the token hashtable, the key to access a location in the hashtable is the token name and the element of the key/element pair would be the token value. Note that because the diagnostic data may include data for multiple computers in a monitored network or subnetwork, one task is to separate the diagnostic data provided to the token processing process 211 according to the computer on which the diagnostic tests were executed. Token types are run against the test output indicated in the test name in the token. For example token types having a test name parameter of "df" are run against "df" test output.

Once all the raw test data has been processed and a completed token data 207 is available, the second set of processing operations to build the representation of the monitored computer may be completed. In order to understand the building of the tree, an examination of several typical features of an element class will provide insight into how an element is used to build a tree.

An element has methods to retrieve the name of the element as well as the various values associated with an element. For example, a disk element includes a method to retrieve a disk ID token which realizes the element as well as having a method to find in the token data base a disk capacity parameter, sectors per track and other tokens such as those shown in Table 3 associated with "SCSI Disk". Those parameters are used to realize a disk element and give it value.

An element of one type is similar to an element of another type. For example; a partition element requires different tokens to provide different values but otherwise is similar to a disk element. The tokens needed to provide value to the partition element may include partition size, partitions used and partition free. Note elements have associated tokens providing a name or ID. As previously described, tokens have both a value and a label. The label or name provides a "tie" for the token. Suppose a disk element is instanced with a name of "c0t1d0". One of its token to be fulfilled is disk size. The token that provides the disk size would have a name of "0t1d0" and a value of 1.2 Gb. The value of 1.2 Gb would be tied to the name "0t1d0".

Figure 9:
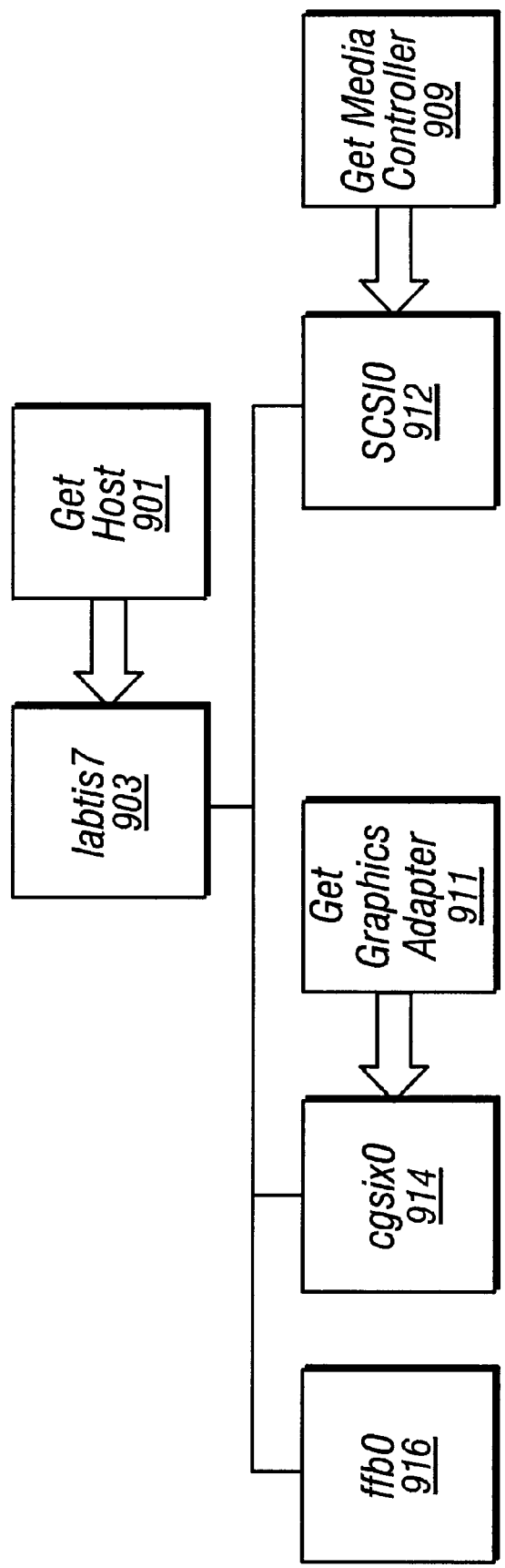
FIG. 9 shows an exemplary instantiation of a portion of a static tree.

Referring to FIG. 9, an example of building a host state based on the elements of the static tree is shown. The term "host state" refers to the representation of the monitored system based on its diagnostic data. The host state essentially describes the state of a system for a given time period. The host state may be viewed as an instantiated element hierarchy based on the raw data that has come in from the remote host. In other words, it is a completed element hierarchy with value. The diagnostic data is collected over a particular time period, so the host state represents the state of the monitored machine over that particular time period, e.g., an hour. The host state is built by starting from the top of the tree element host 301. The element 301 has methods to retrieve relevant tokens from the token data base 207. As shown in FIG. 9, the element 301 is realized as "labtis 7". Because the token data base is a hashtable in the preferred embodiment, the realization of each element is faster. Next element graphics adapter 501 gets graphics adapter cgsix0 814 and ffb0 816. Continuing to build the host state, media controller element gets SCSI0 812 from the data base. In a preferred embodiment, the host state is built in depth order meaning that each element and all branches of that element are built before another element is built. Thus, referring back to FIG. 5, for example, everything on peripheral bus 309 would be built before the building of the software configuration 311. For each element in the static tree, the token data base is searched and the host state is created in element fulfillment processing 205 which requests tokens from token data base 207 in the form of searches for tokens providing realization and value to the static tree.

Once the element fulfillment stage is completed a final token post processing operation takes place in 208. An element can have a token defined that is the mathematical result of other tokens. For example, a disk space free token is derived from a simple subtraction from a disk used token and a total disk space token. The calculations are completed in this post processing operation 208 to complete the host state.

Note that because the tree definition is static and is intended to be general, not all elements will be found in every host state. Thus, when building the host state, no data will be found in the token data base for a particular element that is lacking in the monitored system. Additionally, in some host states, an element will be found more than once.

Thus, the tree structure provides the flexibility to build host states that look very different.

Once the host state is built, it is saved in host state storage 209. The storage of the host state provides several advantages. For one, it provides the capability to search back through time and to compare one host state with another host state from a different time or perform trend analysis over time. The host states may be stored for any amount of time for which adequate storage area is available. For example, host states may be stored for a year.

Additionally, the stored host states are used when the diagnostic data is incomplete. There may be occasions when a test has failed to run in the monitored system or has not run before a scheduled communication of data from the monitored system. That may cause problems in the building of the host state from the static tree, especially where the test was one that created elements lower in the tree (i.e. towards the root). Each element can include a value that indicates how critical the element is to the system. If the element is critical, such as a disk, there could be a problem with the system and it should be noticed. If the data is not critical to the system, then older data could be retrieved from the previous host state in time for that particular host. That could be limited by restricting such retrieval to a specified number of times, e.g., 10, or any other number appropriate to the criticality of the element, before marking data as invalid.

Referring again to FIG. 2, the expert transport 250 provides access to all of the data storage mediums used for the various processes requiring the storage mediums. The communications between processing and storage elements is preferably network based to allow flexibility in implementation as the load of the subsystems may be distributed across machines if need be. Each module can access the expert transport in a very rigid manner making use of the object orientated design facilities provided by Java.

Figure 10:
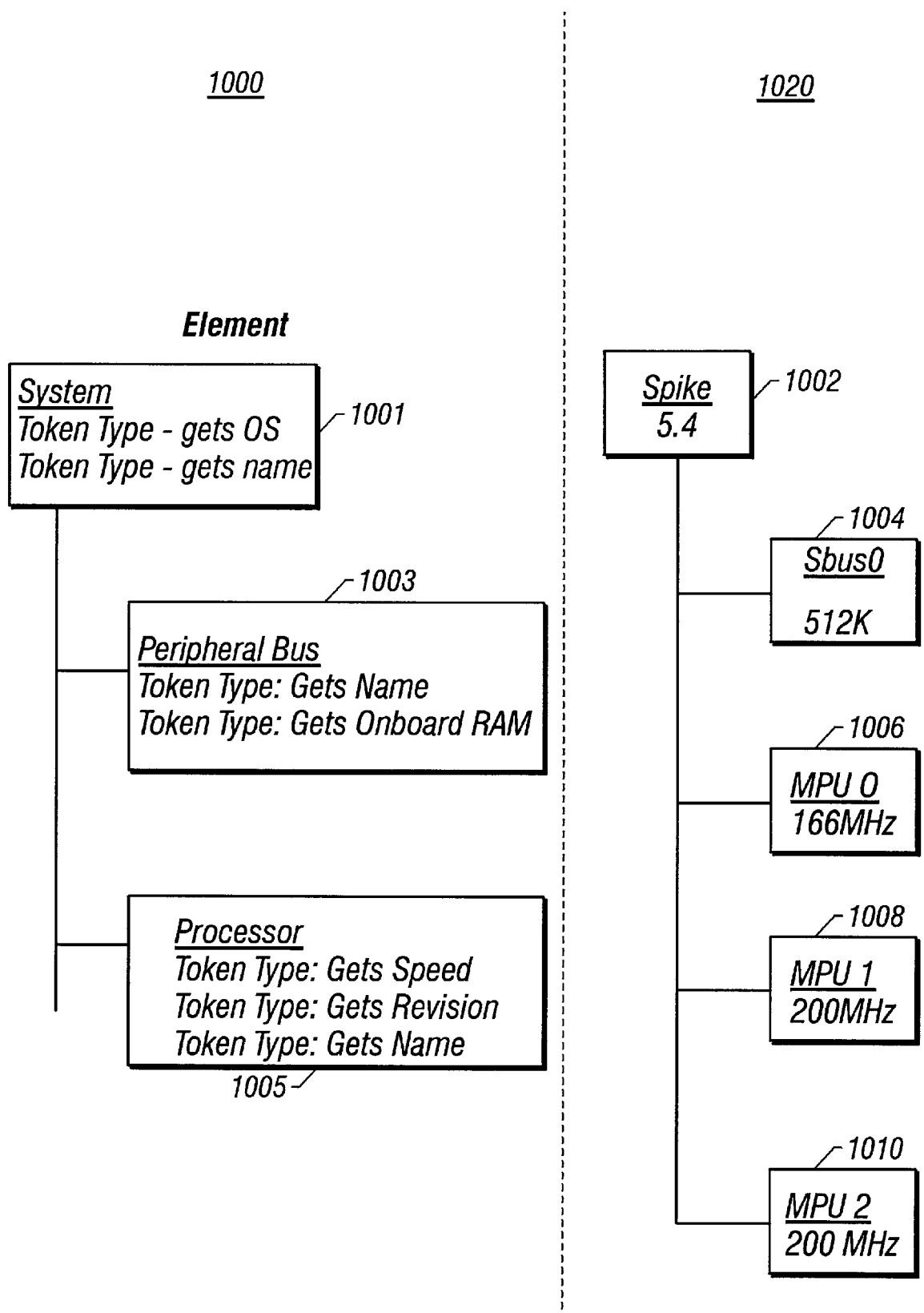
FIG. 10 shows another example of a tree structure and an instantiation of that tree.

A second example of building a host state is shown in FIG. 10. Element 1001 has associated token types for the name of the system and the OS. Peripheral bus element 1003 has associated token types which gets the name of the peripheral bus and any onboard RAM. Element 1005, which is a processor element, has associated token types to provide a name, a revision number and the processor speed. The static definition 1000 creates a host state 1020 where the system is realized as "Spike" with an OS release of 5.4. The peripheral bus is instantiated as Sbus0 with 512 K of RAM. The processor element is instantiated three times as MPU0 1006, MPU1 1008 and MPU2 1010. Thus, an example is provided where a single element is realized more than one time in a particular system.

Figure 11:
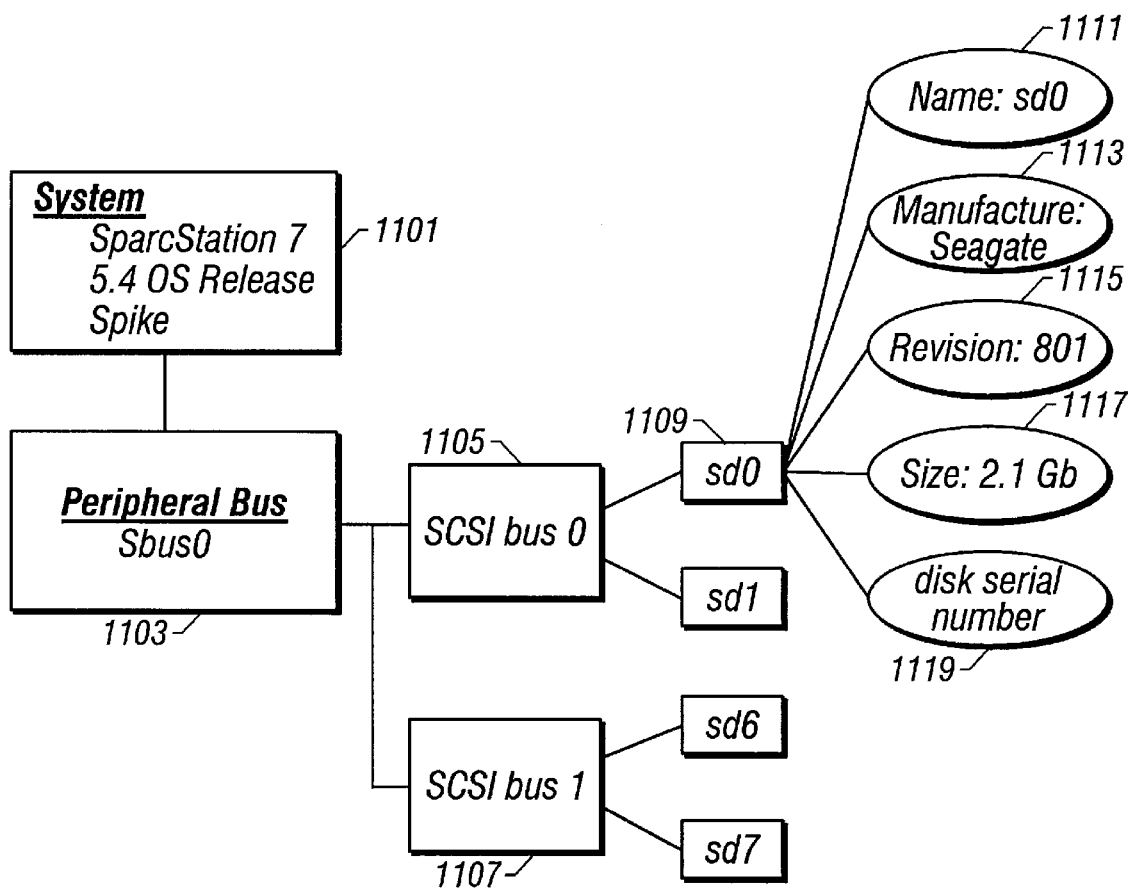
FIG. 11 shows another example of a host state.

Referring to FIG. 11, another example of a host state is provided. The system is shown as element 1101 with associated values of being SparcStation2, with a system name Spike and an OS 5.4 release. The system has a peripheral bus, Sbus0, which has two SCSI buses 1105 and 1107. Attached on SCSI bus 0 are two disks sd0 and sd1. Disk "sd0" has associated tokens, in addition to its name, the manufacturer 1113, the revision 1115, the size of the disk, 1117 and the serial number 1119. As seen in Table 3, for the SCSI disk element, other tokens may be associated with a disk element.

Figure 12:
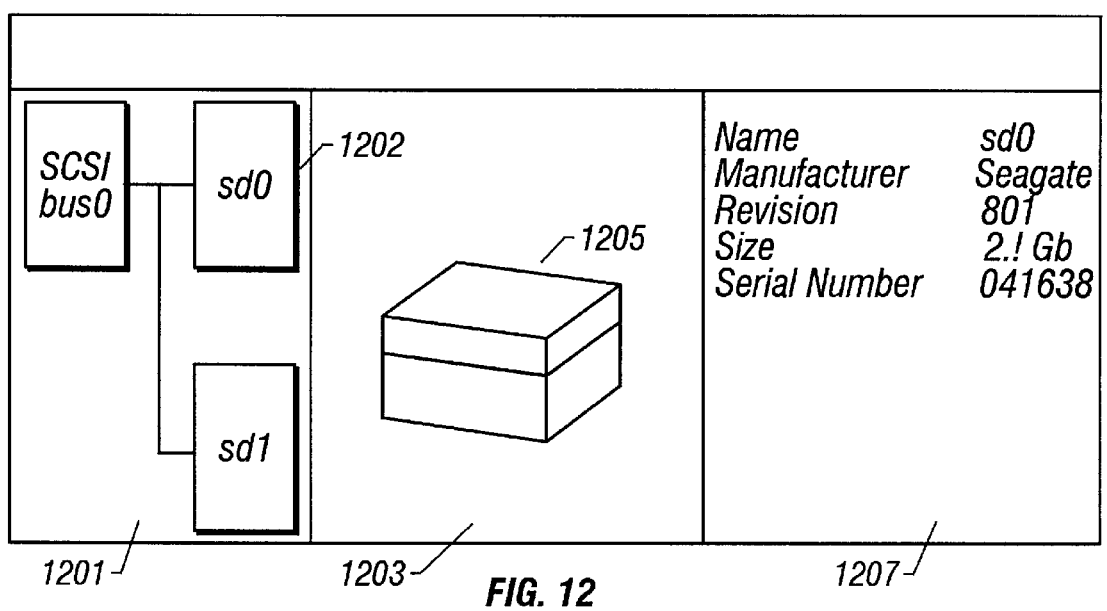
FIG. 12 shows how the host state can be displayed to show graphical, and attribute information about the host state.

In addition to storing the host state in data base 209, the system provides a graphical interface to access information about the host state. Referring to FIG. 12, an exemplary system visualization screen is shown. The tree structure is provided in region 1201 of the screen which graphically represents a portion of the host state shown in FIG. 11. Tree structures may also be represented in the form shown in FIGS. 7a–7e or other appropriate form. In addition to displaying the tree structure which provides the user a graphical depiction of the completed element hierarchy for a particular system at a particular time, the screen also provides a graphical image of the particular component which is being viewed. For instance, region 1203 of the screen shows a graphical image 1205 of a disk. Assuming that the viewer had clicked on disk 1202, sd0, region 1207 shows the attributes or token values associated with the selected element. Thus, the attributes relating to name, manufacturer, revision, size and serial number are all provided. This presents the support engineer with an easily understandable graphical image of the total system, and any particular component of the system that is represented in the host state, along with pertinent attributes.

Referring again to FIG. 2, the system visualizer 225 receives host states from host states database 209 and customer system information stored in data base 235. The system visualizer also receives alerts and local configurations relevant to a particular support engineer. The first task that the system visualizer must be to select the particular host that is to be worked upon or viewed. Thus, the system visualizer will have to search the host states database 209. The visualizer will provide the ability to parse through time to select from all the host states available for a particular system. While each element may have a graphic associated with it, a separate graphic can be used to indicate that a problem exists with a particular element.

In addition to displaying the attributes of an element, which are the values of the tokens associated with the element, the system visualizer provides graphical capability to graph attributes against time. One or more attributes can be selected to be graphed against history. In other words, the same attributes from different instances of the element hierarchy for a particular system can be compared graphically. For example, the amount of disk free over time can be monitored by looking at outputs of the "df" test over a period of time. The df output includes such token values as disk percentage used for a particular partition, partition name and size of partition. The visualizer will extract the tokens representing amount of disk percentage used for a particular set of host states. The host states from which the disk percentage tokens are extracted is determined according to the time period to be viewed. That information can then be visualized by plotting a graph of disk percentage used against time. Also, the visualizer can view different instances of the host state. In other words, the visualizer can view the state of a monitored system at different times. That capability provides a visual interpretation of changes in system configuration. The visualizes accesses the stored multiple instances of the host state of the particular system to provide that capability.

While it is possible for the diagnostic data from the monitored system to come up to the monitoring system in a raw form, it is also possible to do some preprocessing on the data in the monitored system. The preprocessing could translate the diagnostic data to something more easily readable by the monitoring system. As a simple example, the monitored system could eliminate all white space in the test output. The choice of whether to do preprocessing may depend on such considerations as whether the additional load put on the monitored system is a cost that is outweighed by the benefit of simpler processing at the monitoring system.

The description of the invention set forth herein is illustrative, and is not intended to limit the scope of the invention as set forth in the following claims. For instance, while exemplary tests were generally described in terms computers operating in a Unix environment, the invention is also applicable to computer systems utilizing a variety of operating systems. Variations and modifications of the embodiments disclosed herein, may be made based on the description set forth herein, without departing from the scope and spirit of the invention as set forth in the following claims.

TABLE 3

| Element | Element Entries Token Type | Server Legacy 5.4 | Server Legacy 5.5 | Server Enterprise 5.5.1 | Server Enterprise 5.6 | Desktop Legacy 5.5 | Desktop 5.5.1 | Desktop >= Ultra 2 5.6 |
|---|---|---|---|---|---|---|---|---|
| Host | Hostname | uname -a | showrev -a | showrev -a |  | showrev -a | showrev -a | showrev -a |
|  | Platform |  | uname -a | uname -a |  | uname -a | uname -a |  |
|  | Host Id |  | showrev -a | showrev -a |  | showrev -a | showrev -a |  |
|  | Serial Number | ReMon Extract | ReMon Extract | configd | ReMon Extract | ReMon Extract | configd | ReMon Extract |
|  | Data Date | ReMon Extract | ReMon Extract | ReMon Extract | ReMon Extract | ReMon Extract | ReMon Extract | ReMon Extract |
|  | OS Release |  | showrev -a | showrev -a |  |  | showrev -a | showrev -a |
|  | Kernel Architecture |  | showrev -a | showrev -a |  |  | showrev -a | showrev -a |
|  | Application Architecture |  | showrev -a | showrev -a |  |  | showrev -a | showrev -a |
|  | Hardware Provider |  | showrev -a | showrev -a |  |  | showrev -a | showrev -a |
|  | Network Domain |  | showrev -a | showrev -a |  |  | showrev -a | showrev -a |
|  | Kernel Version |  | showrev -a | showrev -a |  |  | showrev -a | showrev -a |
|  | Openwindows Version |  | vtsprobe | vtsprobe |  |  | vtsprobe | vtsprobe |
|  | System Clock Frequency | D | D | D | D | D | D | D |
| Hardware Information | Hardware Information(D) |  | showrev -a | showrev -a |  |  | showrev -a |  |
| System Board | Application Architecture |  | vtsprobe | vtsprobe |  |  | vtsprobe |  |
|  | System Board ID | ND | ND | configd | ND | ND | configd |  |
|  | type | ND | ND | configd | ND | ND | configd |  |
|  | State | ND | ND | configd | ND | ND | ND |  |
|  | slot number | ND | D | configd | D | D | ND |  |
|  | temperature | ND | ND | configd | ND | ND | configd |  |
|  | board reference number | ND | ND | configd | ND | ND | D |  |
| Memory Controller | Memory Controller ID | D | D | configd | D | D | D |  |
|  | memory controller model | ND | ND | configd | ND | ND | ND |  |
| Memory | Memory Value | ND | vtsprobe | configd | ND | vtsprobe | configd |  |
| Memory Simm | Memory Simm ID | ND | ND | configd |  | ND | configd |  |
|  | board reference number | ND | ND | configd |  | ND | configd |  |
|  | size | ND | ND | configd |  | ND | configd |  |
| CPU | CPU Unit ID | ND | vtsprobe | configd | ND | vtsprobe | configd |  |
|  | Clock frequency | ND | vtsprobe | configd | ND | vtsprobe | configd |  |
|  | CPU model | ND | vtsprobe | configd | ND | vtsprobe | configd |  |
|  | CPU dcache size | ND | ND | configd | ND | ND | configd |  |
|  | CPU ccache size | ND | ND | configd | ND | ND | configd |  |
|  | CPU icache size | ND | ND | configd | ND | ND | configd |  |
|  | CPU status | ND | D | configd | D | D | D |  |
| EEPROM | EEPROM Model | ND | ND | configd | ND | ND | ND |  |
|  | Flash Prom model |  | ND | configd |  | ND | configd |  |
| Peripheral Bus | peripheral bus id |  | vtsprobe | vtsprobe | ND | vtsprobe | vtsprobe |  |
|  | Model No | ND | ND | configd | ND | ND | configd |  |
|  | Registration Number | ND | ND | configd | ND | ND | configd |  |
| Audio Port | Audio Port id |  | vtsprobe | configd |  | vtsprobe | configd |  |
| Audio Port Error | Audio Port Error String |  | audio -Iv | audio Iv |  | audio Iv | audio -iv |  |
| Parallel Port | parallel port id |  | vtsprobe | configd |  | vtsprobe | configd |  |
| ParallelPortError | Parallel Port Error String |  | bpptest -Iv | bpptest -Iv |  | bpptest -Iv | bpptest -Iv |  |

TABLE 3-continued

| Element | | Server | | | | Desktop | | | |
|---|---|---|---|---|---|---|---|---|---|
| | | Legacy | | | Enterprise | Legacy | | | >= Ultra 2 |
| Element | Token Type | 5.4 | 5.5 | 5.5.1 | 5.6 | 5.4 | 5.5 | 5.5.1 | 5.6 |
| Serial Port | serial port id | | vtsprobe | configd | | | vtsprobe | configd | |
| Diskette | Diskette ID | ND | vtsprobe | configd | | ND | vtsprobe | configd | |
| | Diskette Status | ND | ND | ND | | ND | ND | ND | |
| | Diskette Type | | ND | configd | | | ND | configd | |
| Peripheral Adaptor | Peripheral Adaptor ID | | vtsprobe | configd | | | vtsprobe | configd | |
| | peripheral adaptor model name | | vtsprobe | configd | | | vtsprobe | configd | |
| | peripheral adaptor type | | vtsprobe | configd | | | vtsprobe | configd | |
| | sbus slot no | ND | ND | configd | | ND | ND | configd | |
| | speed register | ND | ND | configd | | ND | ND | configd | |
| CDROM | CDROM ID | | vtsprobe | configd | | | vtsprobe | configd | |
| Tape | TAPE ID | | vtsprobe | configd | | | vtsprobe | configd | |
| | Tape Type | | vtsprobe | configd | | | vtsprobe | configd | |
| Tape Hardware Errors | Tape HW Error String | | tapetest -lv | tapetest=lv | | | tapetest -lv | tapetest -lv | |
| SCSI Disk | SCSI Disk ID | | vtsprobe | configd | | | vtsprobe | configd | |
| | SCSI Disk Sectors per track | | vtsprobe | vtsprobe | | | vtsprobe | vtsprobe | |
| | SCSI disk firmware rev | | vtsprobe | vtsprobe | | | vtsprobe | vtsprobe | |
| | SCSI disk serial number | | vtsprobe | vtsprobe | | | vtsprobe | vtsprobe | |
| | SCSI Disk Sectors per Cylinder | | vtsprobe | vtsprobe | | | vtsprobe | vtsprobe | |
| | SCSI Disk Sun ID | | vtsprobe | vtsprobe | | | vtsprobe | vtsprobe | |
| | SCSI Disk Cylinders | | vtsprobe | vtsprobe | | | vtsprobe | vtsprobe | |
| | SCSI Disk Capacity | | vtsprobe | vtsprobe | | | vtsprobe | vtsprobe | |
| | SCSI Disk Software Controller | | vtsprobe | vtsprobe | | | vtsprobe | vtsprobe | |
| | SCSI Disk Accessible Cylinders | | vtsprobe | vtsprobe | | | vtsprobe | vtsprobe | |
| | SCSI Disk Tracks per Cylinder | | vtsprobe | vtsprobe | | | vtsprobe | vtsprobe | |
| | SCSI Disk Bytes per Sector | | vtsprobe | vtsprobe | | | vtsprobe | vtsprobe | |
| | SCSI Disk Vendor | | vtsprobe | vtsprobe | | | vtsprobe | vtsprobe | |
| SCSI Disk Error | Disk Error String | | disktest -lv (o) | disktest -lv (o) | | | disktest-lv (o) | disktest -lv (o) | |
| SCSI Disk Partition | SCSI Disk Partition ID | diskprobe | diskprobe | diskprobe | | diskprobe | diskprobe | diskprobe | |
| | SCSI Disk Partition last sector | diskprobe | diskprobe | diskprobe | | diskprobe | diskprobe | diskprobe | |
| | SCSI Disk Partition Sector Count | diskprobe | diskprobe | diskprobe | | diskprobe | diskprobe | diskprobe | |
| | Scsi Disk Partition First Sector | diskprobe | diskprobe | diskprobe | | diskprobe | diskprobe | diskprobe | |
| SCSI Disk Bad Block | SCSI BAD Block ID | dmesg | dmesg | dmesg | dmesg | dmesg | dmesg | dmesg | dmesg |
| | Time occurred | dmesg | dmesg | dmesg | dmesg | dmesg | dmesg | dmesg | dmesg |
| Network Adaptor | Network Adaptor ID | | vtsprobe | configd | | | vtsprobe | configd | |
| | Internet Address | | vtsprobe | configd | | | vtsprobe | configd | |
| | sbus slot no. | ND | ND | ND | | ND | ND | ND | |
| Network Hardware Error | Network HW Error String | | nettest -lv (o) | nettest -lv (o) | | | nettest -lv (o) | nettest -lv (o) | |
| Serial OpticalChannel Processor Host Adaptor | Serial Optical Processor ID | ND | ND | configd | | ND | ND | configd. | |
| | Sbus slot number | ND | ND | configd | | ND | ND | configd | |
| | SO model No. | ND | ND | configd | | ND | ND | configd | |
| Storage Array | | | | | | | | | |
| Storage Array Disk | | | | | | | | | |

TABLE 3-continued

| Element | Element Entries Token Type | Server Legacy 5.4 | Server 5.5 | Server 5.5.1 | Server Enterprise 5.6 | Desktop Legacy 5.4 | Desktop 5.5 | Desktop 5.5.1 | Desktop >= Ultra 2 5.6 |
|---|---|---|---|---|---|---|---|---|---|
| Storage Array Partition | | | | | | | | | |
| Graphics Adaptor | Graphics Adaptor ID | | | | | | | | |
| | graphics adaptor model no | | vtsprobe | configd | | | vtsprobe | configd | |
| | sbus slot number | ND | ND | configd | | ND | ND | configd | |
| Monitor | Monitor Dtype(D) | ND | ND | configd | | ND | ND | configd | |
| Serial Port Expander | | D | D | D | D | D | D | D | D |
| System Board PSU | Power Supply ID | ND | ND | ND | ND | ND | ND | ND | |
| | Power Supply Wattage | ND | ND | ND | ND | ND | ND | ND | |
| | Power Supply Status | D | D | D | NP | D | D | D | |
| System Power Supply | System Power Supply (D) | D | D | D | D | D | D | D | |
| Software package & patches | Software Packages & packages(D) | | | | | | | | |
| Software Package | Software Package ID | | pkginfo -1 | pkginfo -1 | | | pkginfo -1 | pkginfo -1 | |
| | Package Vendor | | pkginfo -1 | pkginfo -1 | | | pkginfo -1 | pkginfo -1 | |
| | Package Files | | pkginfo -1 | pkginfo -1 | | | pkginfo -1 | pkginfo -1 | |
| | Package Category | | pkginfo -1 | pkginfo -1 | | | pkginfo -1 | pkginfo -1 | |
| | Package Architecture | | pkginfo -1 | pkginfo -1 | | | pkginfo -1 | pkginfo -1 | |
| | Package Status | | pkginfo -1 | pkginfo -1 | | | pkginfo -1 | pkginfo -1 | |
| | Package Base Directory | | pkginfo -1 | pkginfo -1 | | | pkginfo -1 | pkginfo -1 | |
| | Package Version | | pkginfo -1 | pkginfo -1 | | | pkginfo -1 | pkginfo -1 | |
| | Package pstamp | | pkginfo -1 | pkginfo -1 | | | pkginfo -1 | pkginfo -1 | |
| | Package Installation date | | pkginfo -1 | pkginfo -1 | | | pkginfo -1 | pkginfo -1 | |
| | Package Name | | pkginfo -1 | pkginfo -1 | | | pkginfo -1 | pkginfo -1 | |
| Software Patch | Software Patch ID | showrev -p | showrev -p | showrev -p | showrev -p | showrev -p | showrev -p | showrev -p | |
| | Revision ID | showrev -p | showrev -p | showrev -p | | showrev -p | showrev -p | showrev -p | |
| Operating System | Operating System ID | showrev -a | showrev -a | showrev -a | showrev -a | showrev -a | showrev -a | showrev -a | |
| | OS Release Type | showrev -a | showrev -a | showrev -a | showrev -a | showrev -a | showrev -a | showrev -a | |
| | OS Release Version | showrev -a | showrev -a | showrev -a | showrev -a | showrev -a | showrev -a | showrev -a | |
| System Services | System Services(D) | D | D | D | D | D | D | D | D |
| Unix Filesystems | Unix Filesystems(D) | D | D | D | D | D | D | D | D |
| Local Filesystems (Boot) | Local Filesystem name | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
| | Associative Device Name | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
| | mount point | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
| | FSCK pass | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
| | mount options | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
| Local Filesystem (Current) | Local Current FIlesystem Name | mount -v | mount -v | mount -v | mount -v | mount -v | mount -v | mount -v | mount -v |
| | Associative Device Name | mount -v | mount -v | mount -v | mount -v | mount -v | mount -v | mount -v | mount -v |
| | mount point | mount -v | mount -v | mount -v | mount -v | mount -v | mount -v | mount -v | mount -v |
| | mount options | mount -v | mount -v | mount -v | mount -v | mount -v | mount -v | mount -v | mount -v |
| | Date mounted since | mount -v | mount -v | mount -v | mount -v | mount -v | mount -v | mount -v | mount -v |
| | Total Kbytes available | df -lk | df -lk | df -lk | df -lk | df -lk | df -lk | df -lk | df -lk |

TABLE 3-continued

|  |  | Server | | | | | Desktop | | |
| --- | --- | --- | --- | --- | --- | --- | --- | --- | --- |
|  |  | Legacy | | Enterprise | | Legacy | | Desktop | >= Ultra 2 |
| Element | Element Entries / Token Type | 5.4 | 5.5 | 5.5.1 | 5.6 | 5.4 | 5.5 | 5.5.1 | 5.6 |
| Cache FS | Total Kbytes used | df -lk | df -lk | df -lk | df -lk | df -lk | df -lk | df -lk | df -lk |
|  | Percentage Capacity | df -lk | df -lk | df -lk | df -lk | df -lk | df -lk | df -lk | df -lk |
|  | Files used | df -I | df -I | df -I | df -I | df -I | df -I | df -I | df -I |
|  | Cachefs Daemon | ps -ef | ps -ef | ps -ef | ps -ef | ps -ef | ps -ef | ps -ef | ps -ef |
| Cached Filesystem (boot) | Cached Filesystem id | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
|  | Filesystem cached | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
|  | mount option | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
| Cached File System(Current) | Cached Filesystem ID | mount -v | mount -v | mount -v | mount -v | mount -v | mount -v | mount -v | mount -v |
|  | Filesystem cached | mount -v | mount -v | mount -v | mount -v | mount -v | mount -v | mount -v | mount -v |
|  | cache bits | cachefsstat | cachefsstat | cachefsstat | cachefsstat | cachefsstat | cachefsstat | cachefsstat | cachefsstat |
|  | cache misses | cachefsstat | cachefsstat | cachefsstat | cachefsstat | cachefsstat | cachefsstat | cachefsstat | cachefsstat |
|  | cache modifies | cachefsstat | cachefsstat | cachefsstat | cachefsstat | cachefsstat | cachefsstat | cachefsstat | cachefsstat |
| NFS Server | NFS Server exists | ps -ef | ps -ef | ps -ef | ps -ef | ps -ef | ps -ef | ps -ef | ps -ef |
| Exported Filesystem (boot) | Exported Filesystem name | more /etc/ dfs/dfstab | more /etc/ dfs/dfstab | more /etc/ dfs/dfstab | more /etc/ dfs/dfstab | more /etc/ dfs/dfstab | more /etc/ dfs/dfstab | more /etc/ dfs/dfstab | more /etc/ dfs/dfstab |
|  | Export options | more /etc/ dfs/dfstab | more /etc/ dfs/dfstab | more /etc/ dfs/dfstab | more /etc/ dfs/dfstab | more /etc/ dfs/dfstab | more /etc/ dfs/dfstab | more /etc/ dfs/dfstab | more /etc/ dfs/dfstab |
|  | Export Description | more /etc/ dfs/dfstab | more /etc/ dfs/dfstab | more /etc/ dfs/dfstab | more /etc/ dfs/dfstab | more /etc/ dfs/dfstab | more /etc/ dfs/dfstab | more /etc/ dfs/dfstab | more /etc/ dfs/dfstab |
| Exported Filesystem (current) | Exported filesystem name | share | share | share | share | share | share | share | share |
|  | Exported file systemm options | share | share | share | share | share | share | share | share |
|  | Exported FS description | share | share | share | share | share | share | share | share |
| NFS Client | Filesystems being mounted | ps -ef | ps -ef | ps -ef | ps -ef | ps -ef | ps -ef | ps -ef | ps -ef |
| Mounted Filesystem (Boot) | Filesystem Name | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
|  | remote machine | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
|  | remote filesystem | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
|  | Mount type (kerberos/NFS) | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
|  | mount point | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
|  | mount permissions | more /etc/ vfstab | more /etc/ vfstab | more /etc/ vfstab | more /etc/ vfstab | more /etc/ vfstab | more /etc/ vfstab | more /etc/ vfstab | more /etc/ vfstab |
| Mounted Filesystem (Current) | Filesystem Name | mount -v | mount -v | mount -v | mount -v | mount -v | mount -v | mount -v | mount -v |
|  | Remote machine | mount -v | mount -v | mount -v | mount -v | mount -v | mount -v | mount -v | mount -v |
|  | remote filesystem | mount -v | mount -v | mount -v | mount -v | mount -v | mount -v | mount -v | mount -v |
|  | mount type | mount -v | mount -v | mount -v | mount -v | mount -v | mount -v | mount -v | mount -v |
|  | mount point | mount -v | mount -v | mount -v | mount -v | mount -v | mount -v | mount -v | mount -v |
|  | Date mounted since | mount -v | mount -v | mount -v | mount -v | mount -v | mount -v | mount -v | mount -v |
|  | Total Kbytes available | df -k | df -k | df -k | df -k | df -k | df -k | df -k | df -k |
|  | Total Kbytes used | df -k | df -k | df -k | df -k | df -k | df -k | df -k | df -k |

TABLE 3-continued

| | Element Entries | Server | | | | Desktop | | | |
|---|---|---|---|---|---|---|---|---|---|
| | | Legacy | | | | Legacy | | | >= Ultra 2 |
| Element | Token Type | 5.4 | 5.5 | 5.5.1 | Enterprise 5.6 | 5.4 | 5.5 | 5.5.1 | 5.6 |
| NIS Server | Percentage Capacity<br>Files used | df -k<br>df | df -k<br>df | df -k<br>df | df -k<br>df | df -k<br>df | df -k<br>df | df -k<br>df | df -k<br>df |
| | NIS Server in existance | ps -ef<br>showrev -a | ps -ef<br>showrev -a | ps -ef<br>showrev -a | ps -ef<br>showrev -a | ps -ef<br>showrev -a | ps -ef<br>showrev -a | ps -ef<br>showrev -a | ps -ef<br>showrev -a |
| NIS client | domainname<br>NIS client software exists | ps -ef<br>showrev -a | ps -ef<br>showrev -a | ps -ef<br>showrev -a | ps -ef<br>showrev -a | ps -ef<br>showrev -a | ps -ef<br>showrev -a | ps -ef<br>showrev -a | ps -ef<br>showrev -a |
| | domainname<br>Server Bound to | ypwhich | ypwhich | ypwhich | ypwhich | ypwhich | ypwhich | ypwhich | ypwhich |
| NIS+ Master | configured as NIS+ Master | niscat -o<br>org_dir | niscat -o<br>org_dir | niscat -o<br>org_dir | | niscat -o<br>org_dir | niscat -o<br>org_dir | niscat -o<br>org_dir | |
| | domainname | niscat -o<br>org_dir | niscat -o<br>org_dir | niscat -o<br>org_dir | | niscat -o<br>org_dir | niscat -o<br>org_dir | niscat -o<br>org_dir | |
| | access rights | niscat -o<br>org_dir | niscat -o<br>org_dir | niscat -o<br>org_dir | | niscat -o<br>org_dir | niscat -o<br>org_dir | niscat -o<br>org_dir | |
| NIS+ Replica | configured as a NIS+ Replica | niscat -o<br>org_dir | niscat -o<br>org_dir | niscat -o<br>org_dir | | niscat -o<br>org_dir | niscat -o<br>org_dir | niscat -o<br>org_dir | |
| | domainname | niscat -o<br>org_dir | niscat -o<br>org_dir | niscat -o<br>org_dir | | niscat -o<br>org_dir | niscat -o<br>org_dir | niscat -o<br>org_dir | |
| | access rights | niscat -o<br>org_dir | niscat -o<br>org_dir | niscat -o<br>org_dir | | niscat -o<br>org_dir | niscat -o<br>org_dir | niscat -o<br>org_dir | |
| | NIS+ Master | niscat -o<br>org_dir | niscat -o<br>org_dir | niscat -o<br>org_dir | | niscat -o<br>org_dir | niscat -o<br>org_dir | niscat -o<br>org_dir | |
| NIS+ Client | configured as aNIS+ client | niscat -o<br>org_dir | niscat -o<br>org_dir | niscat -o<br>org_dir | | niscat -o<br>org_dir | niscat -o<br>org_dir | niscat -o<br>org_dir | |
| | domainname | niscat -o<br>org_dir | niscat -o<br>org_dir | niscat -o<br>org_dir | | niscat -o<br>org_dir | niscat -o<br>org_dir | niscat -o<br>org_dir | |
| | NIS+ Master | niscat -o<br>org_dir | niscat -o<br>org_dir | niscat -o<br>org_dir | | niscat -o<br>org_dir | niscat -o<br>org_dir | niscat -o<br>org_dir | |
| NIS+ Search Path | NTS+ Search Path | niscat -o<br>org_dir | niscat -o<br>org_dir | niscat -o<br>org_dir | | niscat -o<br>org_dir | niscat -o<br>org_dir | niscat -o<br>org_dir | |
| DNS client | DNS being used | ps -ef | ps -ef | ps -ef | ps -ef | ps -ef | ps -ef | ps -ef | |
| DNS resolve hosts | DNS resolve host id | more /etc/<br>resolv.conf | more /etc/<br>resolv.conf | more /etc/<br>resolv.conf | | more /etc/<br>resolv.conf | more /etc/<br>resolv.conf | more /etc/<br>resolv.conf | |
| NameService Configuration | String Dummy Token | D | D | D | D | D | D | D | D |
| Password Map Resolve Type | Name Service map Resolved by | more /etc/<br>nss-<br>witch.conf | more /etc/<br>nss-<br>witch.conf | more /etc/<br>nss-<br>witch.conf | | more /etc/<br>nss-<br>witch.conf | more /etc/<br>nss-<br>witch.conf | more /etc/<br>nss-<br>witch.conf | |
| Group MapResolve Type | Name Service map Resolved by | more /etc/<br>nss-<br>witch.conf | more /etc/<br>nss-<br>witch.conf | more /etc/<br>nss-<br>witch.conf | | more /etc/<br>nss-<br>witch.conf | more /etc/<br>nss-<br>witch.conf | more /etc/<br>nss-<br>witch.conf | |
| Hosts Map Resolve Type | Name Service map resolved by | more /etc/<br>nss-<br>witch.conf | more /etc/<br>nss-<br>witch.conf | more /etc/<br>nss-<br>witch.conf | | more /etc/<br>nss-<br>witch.conf | more /etc/<br>nss-<br>witch.conf | more /etc/<br>nss-<br>witch.conf | |
| Protocols Map Resolve Type | Name Service map resolved by | more /etc/<br>nss-<br>witch.conf | more /etc/<br>nss-<br>witch.conf | more /etc/<br>nss-<br>witch.conf | | more /etc/<br>nss-<br>witch.conf | more /etc/<br>nss-<br>witch.conf | more /etc/<br>nss-<br>witch.conf | |
| RPC Map Resolve Type | Name Service map resolved by | more /etc/<br>witch.conf | more /etc/<br>witch.conf | more /etc/<br>witch.conf | | more /etc/<br>witch.conf | more /etc/<br>witch.conf | more /etc/<br>witch.conf | |

TABLE 3-continued

| | | Server | | | | Desktop | | | |
|---|---|---|---|---|---|---|---|---|---|
| | | Legacy | | Enterprise | | Legacy | | | >= Ultra 2 |
| Element | Element Entries Token Type | 5.4 | 5.5 | 5.5.1 | 5.6 | 5.4 | 5.5 | 5.5.1 | 5.6 |
| Ethers Map Resolve Type | Name Service map resolved by | nss-witch.conf more /etc/nss-witch.conf | nss-witch.conf more /etc/nss-witch.conf | nss-witch.conf more /etc/nss-witch.conf | | nss-witch.conf more /etc/nss-witch.conf | nss-witch.conf more /etc/nss-witch.conf | nss-witch.conf more /etc/nss-witch.conf | |
| Netmasks Map Resolve Type | Name Service map Resolved by | nss-witch.conf more /etc/nss-witch.conf | nss-witch.conf more /etc/nss-witch.conf | nss-witch.conf more /etc/nss-witch.conf | | nss-witch.conf more /etc/nss-witch.conf | nss-witch.conf more /etc/nss-witch.conf | nss-witch.conf more /etc/nss-witch.conf | |
| bootparams Map Resolve Type | Name Service map Resolved by | nss-witch.conf more /etc/nss-witch.conf | nss-witch.conf more /etc/nss-witch.conf | nss-witch.conf more /etc/nss-witch.conf | | nss-witch.conf more /etc/nss-witch.conf | nss-witch.conf more /etc/nss-witch.conf | nss-witch.conf more /etc/nss-witch.conf | |
| publickey Map Resolve Type | Name Service map Resolved by | nss-witch.conf more /etc/nss-witch.conf | nss-witch.conf more /etc/nss-witch.conf | nss-witch.conf more /etc/nss-witch.conf | | nss-witch.conf more /etc/nss-witch.conf | nss-witch.conf more /etc/nss-witch.conf | nss-witch.conf more /etc/nss-witch.conf | |
| netgroup Map Resolve Type | Name Service Map Resolved by | nss-witch.conf more /etc/nss-witch.conf | nss-witch.conf more /etc/nss-witch.conf | nss-witch.conf more /etc/nss-witch.conf | | nss-witch.conf more /etc/nss-witch.conf | nss-witch.conf more /etc/nss-witch.conf | nss-witch.conf more /etc/nss-witch.conf | |
| automount Map Resolve Type | Name Service Map Resolved by | nss-witch.conf more /etc/nss-witch.conf | nss-witch.conf more /etc/nss-witch.conf | nss-witch.conf more /etc/nss-witch.conf | | nss-witch.conf more /etc/nss-witch.conf | nss-witch.conf more /etc/nss-witch.conf | nss-witch.conf more /etc/nss-witch.conf | |
| aliases Map resolve Type | Name Service Map Resolved by | nss-witch.conf more /etc/nss-witch.conf | nss-witch.conf more /etc/nss-witch.conf | nss-witch.conf more /etc/nss-witch.conf | | nss-witch.conf more /etc/nss-witch.conf | nss-witch.conf more /etc/nss-witch.conf | nss-witch.conf more /etc/nss-witch.conf | |
| services Map resolve Type | Name Service Map Resolved by | nss-witch.conf more /etc/nss-witch.conf | nss-witch.conf more /etc/nss-witch.conf | nss-witch.conf more /etc/nss-witch.conf | | nss-witch.conf more /etc/nss-witch.conf | nss-witch.conf more /etc/nss-witch.conf | nss-witch.conf more /etc/nss-witch.conf | |
| sendmailvars resolve Type | Name Service Map Resolved By | nss-witch.conf more /etc/nss-witch.conf | nss-witch.conf more /etc/nss-witch.conf | nss-witch.conf more /etc/nss-witch.conf | | nss-witch.conf more /etc/nss-witch.conf | nss-witch.conf more /etc/nss-witch.conf | nss-witch.conf more /etc/nss-witch.conf | |
| CRON root cronjob | cron is running | ps -ef | ps -ef | ps -ef | ps -ef | ps -ef | ps -ef | ps -ef | ps -ef |
| | cronjob name | crontab -1 | crontab -1 | crontab -1 | crontab -1 | crontab -1 | crontab -1 | crontab -1 | crontab -1 |
| | cronjob time control string | crontab -1 | crontab -1 | crontab -1 | crontab -1 | crontab -1 | crontab -1 | crontab -1 | crontab -1 |
| Sendmail | cronjob execution string sendmail is running | ps -ef | ps -ef | ps -ef | ps -ef | ps -ef | ps -ef | ps -ef | ps -ef |
| | major relay mailer | more /etc/mail/sendmail.cf | more /etc/mail/sendmail.cf | more /etc/mail/sendmail.cf | more /etc/mail/sendmail.cf | more /etc/mail/sendmail.cf | more /etc/mail/sendmail.cf | more /etc/mail/sendmail.cf | more /etc/mail/sendmail.cf |
| | major relay host (DR) | more /etc/mail/sendmail.cf | more /etc/mail/sendmail.cf | more /etc/mail/sendmail.cf | more /etc/mail/sendmail.cf | more /etc/mail/sendmail.cf | more /etc/mail/sendmail.cf | more /etc/mail/sendmail.cf | more /etc/mail/sendmail.cf |
| | major relay host (CR) | more /etc/mail/sendmail.cf | more /etc/mail/sendmail.cf | more /etc/mail/sendmail.cf | more /etc/mail/sendmail.cf | more /etc/mail/sendmail.cf | more /etc/mail/sendmail.cf | more /etc/mail/sendmail.cf | more /etc/mail/sendmail.cf |
| TCP/IP | Name of Ethernet board | showrev -aD | vtsprobe showrev -aD | configd showrev -aD | showrev -aD | showrev -aD | vtsprobe showrev -aD | configd showrev -aD | showrev -aD |
| Routing Table | Internet Address Dummy Token | | | | | | | | |

TABLE 3-continued

| Element | Element Entries | | Server | | | | Desktop | | | |
| | Token Type | Legacy | | | Enterprise | Legacy | | | >= Ultra 2 |
| | | 5.4 | 5.5 | 5.5.1 | 5.6 | 5.4 | 5.5 | 5.5.1 | 5.6 |
|---|---|---|---|---|---|---|---|---|---|
| Network Route | Network Route Destination | netstat -r | netstat -r | netstat -r | netstat -r | netstat -r | netstat -r | netstat -r | netstat -r |
| | Gateway | netstat -r | netstat -r | netstat -r | netstat -r | netstat -r | netstat -r | netstat -r | netstat -r |
| | Flags | netstat -r | netstat -r | netstat -r | netstat -r | netstat -r | netstat -r | netstat -r | netstat -r |
| | use | netstat -r | netstat -r | netstat -r | netstat -r | netstat -r | netstat -r | netstat -r | netstat -r |
| Network Known host list | Dummy Token | D | D | D | D | D | D | D | D |
| Network Known host | Known IP address | arp -a | arp -a | arp -a | arp -a | arp -a | arp -a | arp -a | arp -a |
| | Network Mask | arp -a | arp -a | arp -a | arp -a | arp -a | arp -a | arp -a | arp -a |
| | Physical Address | arp -a | arp -a | arp -a | arp -a | arp -a | arp -a | arp -a | arp -a |
| Javastation boot list Javastation | | | | | | | | | |
| Volume manager | Create if running | ps -ef | ps -ef | ps -ef | ps -ef | ps -ef | ps -ef | ps -ef | ps -ef |
| Kernel | Kernel Architecture | showrev -a | showrev -a | showrev -a | showrev -a | showrev -a | showrev -a | showrev -a | showrev -a |
| | Kernel memory | | vtsprobe kmemleak | vtsprobe kmemleak | | | vtsprobe kmemleak | vtsprobe kmemleak | |
| Kernel Memory Leak | Value leaked | | | | | | | | |
| Kernel module list | Dummy Token | D | D | D | D | D | D | D | D |
| kernel module | Kernel Module Name | modinfo | modinfo | modinfo | modinfo | modinfo | modinfo | modinfo | modinfo |
| | Kernel Module Load address | modinfo | modinfo | modinfo | modinfo | modinfo | modinfo | modinfo | modinfo |
| | Kernel Module Info | modinfo | modinfo | modinfo | modinfo | modinfo | modinfo | modinfo | modinfo |
| | Kernel Module Revision | modinfo | modinfo | modinfo | modinfo | modinfo | modinfo | modinfo | modinfo |
| kernel statistics | dummy Token | D | D | D | D | D | D | D | D |
| | dummy token | D | D | D | D | D | D | D | D |
| VMHAT | VH CTX Free | | netstat -k | netstat -k | | | netstat -k | netstat -k | |
| | VH CTX Dirty | | netstat -k | netstat -k | | | netstat -k | netstat -k | |
| | VH CTX steal | | netstat -k | netstat -k | | | netstat -k | netstat -k | |
| | VH TTE load | | netstat -k | netstat -k | | | netstat -k | netstat -k | |
| | VH page faults | | netstat -k | netstat -k | | | netstat -k | netstat -k | |
| | VH steal count | | netstat -k | netstat -k | | | netstat -k | netstat -k | |
| Segment map | Dummy test | D | | | D | D | | | D |
| | Faults | | netstat -k | netstat -k | | | netstat -k | netstat -k | |
| | Faulta | | netstat -k | netstat -k | | | netstat -k | netstat -k | |
| | getmap | | netstat -k | netstat -k | | | netstat -k | netstat -k | |
| | Page Create | | netstat -k | netstat -k | | | netstat -k | netstat -k | |
| Buffer IO | Dummy Token | D | | | D | D | | | D |
| | Buffer Cache Lookups | | netstat -k | netstat -k | | | netstat -k | netstat -k | |
| | Buffer Cache bits | | netstat -k | netstat -k | | | netstat -k | netstat -k | |
| | Waits for Buffer Allocations | | netstat -k | netstat -k | | | netstat -k | netstat -k | |
| | Duplicate Buffers found | | netstat -k | netstat -k | | | netstat -k | netstat -k | |
| System pages | Dummy Token | D | | | D | D | | | D |
| | Physical Memory | | netstat -k | netstat -k | | | netstat -k | netstat -k | |
| | Inalloc | | netstat -k | netstat -k | | | netstat -k | netstat -k | |
| | nFree | | netstat -k | netstat -k | | | netstat -k | netstat -k | |
| | kernel base | | netstat -k | netstat -k | | | netstat -k | netstat -k | |
| | econtig | | netstat -k | netstat -k | | | netstat -k | netstat -k | |
| | free memory | | netstat -k | netstat -k | | | netstat -k | netstat -k | |
| | available rmem | | netstat -k | netstat -k | | | netstat -k | netstat -k | |

TABLE 3-continued

| Element | Token Type | Server Legacy 5.4 | Server Legacy 5.5 | Server Enterprise 5.5.1 | Server Enterprise 5.6 | Desktop Legacy 5.4 | Desktop Legacy 5.5 | Desktop 5.5.1 | Desktop >= Ultra 2 5.6 |
|---|---|---|---|---|---|---|---|---|---|
| | pages free | | netstat -k | netstat -k | | | netstat -k | netstat -k | |
| | pages locked | | netstat -k | netstat -k | | | netstat -k | netstat -k | |
| RPC CLTS Client | Dummy Token | D | | | D | D | | | D |
| | Calls | | netstat -k | netstat -k | | | netstat -k | netstat -k | |
| | Badcalls | | netstat -k | netstat -k | | | netstat -k | netstat -k | |
| | badxids | | netstat -k | netstat -k | | | netstat -k | netstat -k | |
| | timeouts | | netstat -k | netstat -k | | | netstat -k | netstat -k | |
| RPC COTS Client | Dummy Token | D | | | D | D | | | D |
| | Calls | | netstat -k | netstat -k | | | netstat -k | netstat -k | |
| | badcalls | | netstat -k | netstat -k | | | netstat -k | netstat -k | |
| | badxids | | netstat -k | netstat -k | | | netstat -k | netstat -k | |
| | interrupts | | netstat -k | netstat -k | | | netstat -k | netstat -k | |
| RPC COTS Connections | Dummy Token | D | | | D | D | | | D |
| | Write Queue | | netstat -k | netstat -k | | | netstat -k | netstat -k | |
| | Server | | netstat -k | netstat -k | | | netstat -k | netstat -k | |
| | status | | netstat -k | netstat -k | | | netstat -k | netstat -k | |
| RPC Client | Dummy Token | D | | | D | D | | | D |
| | calls | | netstat -k | netstat -k | | | netstat -k | netstat -k | |
| | badcalls | | netstat -k | netstat -k | | | netstat -k | netstat -k | |
| | re transmits | | netstat -k | netstat -k | | | netstat -k | netstat -k | |
| | badxids | | netstat -k | netstat -k | | | netstat -k | netstat -k | |
| | can't send | | netstat -k | netstat -k | | | netstat -k | netstat -k | |
| RPC CLTS Server | Dummy Token | D | | | D | D | | | D |
| | Calls | | netstat -k | netstat -k | | | netstat -k | netstat -k | |
| | badcalls | | netstat -k | netstat -k | | | netstat -k | netstat -k | |
| | xdr call | | netstat -k | netstat -k | | | netstat -k | netstat -k | |
| RPC COTS Server | Dummy Token | D | | | D | D | | | D |
| | calls | | netstat -k | netstat -k | | | netstat -k | netstat -k | |
| | badcalls | | netstat -k | netstat -k | | | netstat -k | netstat -k | |
| | xdr call | | netstat -k | netstat -k | | | netstat -k | netstat -k | |
| RPC Server | Dummy Token | D | | | D | D | | | D |
| | calls | | netstat -k | netstat -k | | | netstat -k | netstat -k | |
| | bad calls | | netstat -k | netstat -k | | | netstat -k | netstat -k | |
| | xdr calls | | netstat -k | netstat -k | | | netstat -k | netstat -k | |
| Inode cache | Dummy Token | D | | | D | D | | | D |
| | size | | netstat -k | netstat -k | | | netstat -k | netstat -k | |
| | maxsize | | netstat -k | netstat -k | | | netstat -k | netstat -k | |
| | hits | | netstat -k | netstat -k | | | netstat -k | netstat -k | |
| | misses | | netstat -k | netstat -k | | | netstat -k | netstat -k | |
| | mallocs | | netstat -k | netstat -k | | | netstat -k | netstat -k | |
| Kernel Mmory magazine | Magazine ID | | | | | | | | |
| | Buffer Size | | | | | | | | |
| | buffer available | | | | | | | | |
| | alloc fail | | | | | | | | |
| kernel memory buffer control cache | Dummy Token | D | | | D | D | | | D |

TABLE 3-continued

| Element | Element Entries | | Server | | | | Desktop | | |
| | | | Legacy | | | | Legacy | | |
| | Token Type | 5.4 | 5.5 | 5.5.1 | 5.6 | 5.4 | 5.5 | 5.5.1 | >= Ultra 2 5.6 |
| --- | --- | --- | --- | --- | --- | --- | --- | --- | --- |
| Element | | | | | | | | | |
| kernel memory allocation | Buffer Size | | netstat -k | netstat -k | | | netstat -k | netstat -k | |
| | buffer available | | netstat -k | netstat -k | | | netstat -k | netstat -k | |
| | Kernel memory allocation ID | | netstat -k | netstat -k | | | netstat -k | netstat -k | |
| | Buffer Available | | netstat -k | netstat -k | | | netstat -k | netstat -k | |
| | buffer size | | netstat -k | netstat -k | | | netstat -k | netstat -k | |
| | buffer total | | netstat -k | netstat -k | | | netstat -k | netstat -k | |
| SFMMU Cache | SFMMU Cache ID | | netstat -k | netstat -k | | | netstat -k | netstat -k | |
| | Buffer Available | | netstat -k | netstat -k | | | netstat -k | netstat -k | |
| | Failed Allocations | | netstat -k | netstat -k | | | netstat -k | netstat -k | |
| Segment Cache | Dummy Token | | netstat -k | netstat -k | | | netstat -k | netstat -k | |
| | Buffer Available | | netstat -k | netstat -k | | | netstat -k | netstat -k | |
| | Failed Allocations | | netstat -k | netstat -k | | | netstat -k | netstat -k | |
| Thread Cache | Dummy Token | D | D | D | D | D | D | D | D |
| | buffer available | | netstat -k | netstat -k | | | netstat -k | netstat -k | |
| | Failed Allocations | | netstat -k | netstat -k | | | netstat -k | netstat -k | |
| Leight Weight Process Cache | Dummy Token | D | D | D | D | D | D | D | D |
| | buffer available | | netstat -k | netstat -k | | | netstat -k | netstat -k | |
| | Failed Allocations | | netstat -k | netstat -k | | | netstat -k | netstat -k | |
| CRED Cache | Dummy Token | D | D | D | D | D | D | D | D |
| | buffer available | | netstat -k | netstat -k | | | netstat -k | netstat -k | |
| | Failed Allocations | | netstat -k | netstat -k | | | netstat -k | netstat -k | |
| Thread Cache | Dummy Token | D | D | D | D | D | D | D | D |
| | buffer available | | netstat -k | netstat -k | | | netstat -k | netstat -k | |
| | Failed Allocations | | netstat -k | netstat -k | | | netstat -k | netstat -k | |
| | global allocations | | netstat -k | netstat -k | | | netstat -k | netstat -k | |
| Streams Message | Stream message ID | | netstat -k | netstat -k | | | netstat -k | netstat -k | |
| | Buffer Available | | netstat -k | netstat -k | | | netstat -k | netstat -k | |
| | Allocation Failures | | netstat -k | netstat -k | | | netstat -k | netstat -k | |
| Stream Head Cache | Dummy Data | D | D | D | D | D | D | D | D |
| | Buffer Available | | netstat -k | netstat -k | | | netstat -k | netstat -k | |
| | Allocation Failures | | netstat -k | netstat -k | | | netstat -k | netstat -k | |
| Queue Cache | Dummy Data | D | D | D | D | D | D | D | D |
| | Buffer Available | | netstat -k | netstat -k | | | netstat -k | netstat -k | |
| | Allocation Failures | | netstat -k | netstat -k | | | netstat -k | netstat -k | |
| Sync Q Cache | Dummy Data | D | D | D | D | D | D | D | D |
| | Buffer Available | | netstat -k | netstat -k | | | netstat -k | netstat -k | |
| | Allocation Failures | | netstat -k | netstat -k | | | netstat -k | netstat -k | |
| Streams Message | Dummy Data | D | D | D | D | D | D | D | D |
| | Buffer Available | | netstat -k | netstat -k | | | netstat -k | netstat -k | |
| | Allocation Failures | | netstat -k | netstat -k | | | netstat -k | netstat -k | |
| anonymous Cache | Dummy Data | D | D | D | D | D | D | D | D |
| | Buffer Available | | netstat -k | netstat -k | | | netstat -k | netstat -k | |
| | Allocation Failures | | netstat -k | netstat -k | | | netstat -k | netstat -k | |
| anonymous map Cache | Dummy Data | D | D | D | D | D | D | D | D |
| | Buffer Available | | netstat -k | netstat -k | | | netstat -k | netstat -k | |
| | Allocation Failures | | netstat -k | netstat -k | | | netstat -k | netstat -k | |

TABLE 3-continued

| Element | Element Entries Token Type | Server Legacy 5.4 | Server Legacy 5.5 | Server 5.5.1 | Server Enterprise 5.6 | Desktop Legacy 5.4 | Desktop Legacy 5.5 | Desktop 5.5.1 | Desktop >= Ultra 2 5.6 |
|---|---|---|---|---|---|---|---|---|---|
| seg VN Cache | Dummy Data | D | D | D | D | D | D | D | D |
|  | Buffer Available |  | netstat -k | netstat -k | netstat -k |  | netstat -k | netstat -k | netstat -k |
|  | Allocation Failures |  | netstat -k | netstat -k | netstat -k |  | netstat -k | netstat -k | netstat -k |
| UFS InodeCache | Dummy Data | D | D | D | D | D | D | D | D |
|  | Buffer Available |  | netstat -k | netstat -k | netstat -k |  | netstat -k | netstat -k | netstat -k |
|  | Allocation Failures |  | netstat -k | netstat -k | netstat -k |  | netstat -k | netstat -k | netstat -k |
| FASCache | Dummy Data | D | D | D | D | D | D | D | D |
|  | Buffer Available |  | netstat -k | netstat -k | netstat -k |  | netstat -k | netstat -k | netstat -k |
|  | Allocation Failures |  | netstat -k | netstat -k | netstat -k |  | netstat -k | netstat -k | netstat -k |
| PipeCache | Dummy Data | D | D | D | D | D | D | D | D |
|  | Buffer Available |  | netstat -k | netstat -k | netstat -k |  | netstat -k | netstat -k | netstat -k |
|  | Allocation Failures |  | netstat -k | netstat -k | netstat -k |  | netstat -k | netstat -k | netstat -k |
| LM sysid | Dummy Data | D | D | D | D | D | D | D | D |
|  | Buffer Available |  | netstat -k | netstat -k | netstat -k |  | netstat -k | netstat -k | netstat -k |
|  | Allocation Failures |  | netstat -k | netstat -k | netstat -k |  | netstat -k | netstat -k | netstat -k |
| LM client | Dummy Data | D | D | D | D | D | D | D | D |
|  | Buffer Available |  | netstat -k | netstat -k | netstat -k |  | netstat -k | netstat -k | netstat -k |
|  | Allocation Failures |  | netstat -k | netstat -k | netstat -k |  | netstat -k | netstat -k | netstat -k |
| Virtual Memory | Dummy Token |  | vtsprobe | vtsprobe |  |  | vtsprobe | vtsprobe |  |
|  | Total Virtual Memory size | vmstat | vmstat | vmstat |  | vmstat | vmstat | vmstat |  |
| Page Fault | Virtual Memory Free | vmstat | vmstat | vmstat |  | vmstat | vmstat | vmstat |  |
|  | Page fault id |  |  |  |  |  |  |  |  |
| Windowing System | Windowing system revision | showrev -a | showrev -a | showrev -a |  | showrev -a | showrev -a | showrev -a |  |
|  | Display Size | xdpyinfo | xdpyinfo | xdpyinfo |  | xdpyinfo | xdpyinfo | xdpyinfo |  |
|  | Depth of root window | xdpyinfo | xdpyinfo | xdpyinfo |  | xdpyinfo | xdpyinfo | xdpyinfo |  |
|  | resolution | xdpyinfo | xdpyinfo | xdpyinfo |  | xdpyinfo | xdpyinfo | xdpyinfo |  |
| Process Table | Dummy Token | D | D | D | D | D | D | D | D |
| Process | process name | ps -ef | ps -ef | ps -ef | ps -ef | ps -ef | ps -ef | ps -ef | ps -ef |
|  | time | ps -ef | ps -ef | ps -ef | ps -ef | ps -ef | ps -ef | ps -ef | ps -ef |
|  | process id | ps -ef | ps -ef | ps -ef | ps -ef | ps -ef | ps -ef | ps -ef | ps -ef |
|  | parent id | D | D | D | D | D | D | D | D |
| Unbundled Software | Dummy Token |  |  |  |  |  |  |  |  |
| Solstice DiskSuite | installed | ND | ND | pkginfo -1 | pkginfo -1 | ND | ND | pkginfo -1 | pkginfo -1 |
| MetaDisk Partition | Symond running | ND | ND | ps -ef | ps -ef | ND | ND | ps -ef | ps -ef |
| Solstice Backup | Kernel reader running | ND | ND | ps -ef | ps -ef | ND | ND | ps -ef | ps -ef |
| Solstice Backup partition | Log scanner running | ND | ND | ps -ef | ps -ef | ND | ND | ps -ef | ps -ef |
| Solstice Symon |  |  |  |  |  |  |  |  |  |

TABLE 3-continued

| Element | Element Entries | Server | | | | | | Desktop | | |
| | | Legacy | | 5.5.1 | Enterprise | | Legacy | | 5.5.1 | >= Ultra 2 |
| | Token Type | 5.4 | 5.5 | 5.5.1 | 5.6 | 5.4 | 5.5 | 5.5.1 | 5.6 |
|---|---|---|---|---|---|---|---|---|---|---|
| Sybase | Sybase datasrver running | ps -ef | ps -ef | ps -ef | ps -ef | ps -ef | ps -ef | ps -ef | ps -ef |
| | sybase backup dataserver running | ps -ef | ps -ef | ps -ef | ps -ef | ps -ef | ps -ef | ps -ef | ps -ef |
| Oracle | Oracle server running | ps -ef | ps -ef | ps -ef | ps -ef | ps -ef | ps -ef | ps -ef | ps -ef |
| Informix | Informix server running | ps -ef | ps -ef | ps -ef | ps -ef | ps -ef | ps -ef | ps -ef | ps -ef |
| SAP | | | | | | | | | |

Key
(D) - Dummy Token
(M) - Output of test must be modified as it is different across OS releases
(ND) - No data available
*Blank spaces means untested or unknown tests

What is claimed is:

1. A method of rebuilding the state of a computer system, comprising:

providing a static tree structure representing a general computer system;

extracting component information indicating hardware and software components of the computer system, from diagnostic data of the computer system; and generating a representation of the computer system according to the tree structure and the component information, wherein the computer system is part of a first computer system and the diagnostic data is communicated from the first computer system to a second computer system, the second computer system rebuilding the state of the computer system.

2. The method as recited in claim 1 wherein the static tree structure includes element types in a fixed hierarchical relationship, the element types representing the hardware and software components of the computer system.

3. The method as recited in claim 2 further comprising extracting the component information as a plurality of tokens, the tokens being respective instances of respective token types, each of the token types having a value of one aspect of the component information and an indication of an association with one of the elements in the static tree.

4. The method as recited in claim 3 further comprising building a token data base of the component information from plurality of tokens.

5. The method as recited in claim 4 wherein the token data base is created as a hashtable.

6. The method as recited in claim 4 wherein the generating of the representation of the computer system further comprises:

for each respective element type in the static tree structure, searching the token data base for at least one token that refers to the respective element type;

building the representation of the computer system having instantiated elements according to the tokens in the token data base.

7. The method as recited in claim 6 wherein a respective element type is instantiated when a realizing token is found in the diagnostic data associated with the respective element type.

8. The method as recited in claim 7 wherein the realizing token provides a name for the element type.

9. The method as recited in claim 6 wherein a system representation is built by identifying all tokens in the token data base associated with one element before searching the token data base for tokens referring to another element type.

10. The method as recited in claim 6 wherein at least one of the elements has a token defined to be a result of a mathematical operation on other tokens.

11. The method as recited in claim 6 wherein the representation of the computer system has less than all of all the element types in the static tree structure.

12. The method as recited in claim 6 wherein the representation of the computer system has instantiated more than one of at least one of the element types in the static tree structure.

13. The method as recited in claim 3 wherein multiple tokens are generated from a single token type.

14. The method as recited in claim 1 wherein the diagnostic data is communicated a plurality of times and a system representation is built for each communication of diagnostic test results, each system representation being a host state.

15. The method as recited in claim 14 wherein when diagnostic data is missing from a communication of diagnostic data, missing data is filled in based on a previous host state saved in a data base.

16. A data structure for representing a host state of a monitored computer system, the data structure being encoded in computer readable media and comprising:

a plurality of elements in a fixed hierarchical structure representing components of the monitored computer system; and at least one token respectively associated with each of the elements, the at least one token providing a first expression representing a value of an associated element and a second expression representing the name of the associated element.

17. The data structure as recited in claim 16 wherein the hierarchical structure includes hardware and software elements.

18. The data structure as recited in claim 17 wherein each of the hardware and software elements represents one of a physical and virtual component of the monitored computer system.

19. A computer program stored on computer readable media and operable in a monitoring computer system to:

provide a static tree structure representing a general computer system;

extract component information indicating hardware and software components of a monitored computer system, from diagnostic data of the monitored computer system; and generate a representation of the monitored computer system according to the tree structure and the component information, wherein the diagnostic data is communicated from the monitored computer system to the monitoring computer system for rebuilding the state of the general computer system.

20. The computer program as recited in claim 19 wherein the static tree structure includes element types in a fixed hierarchical relationship, the element types representing hardware and software components of the monitored computer system.

21. The computer program as recited in claim 20, wherein the component information is extracted as a plurality of tokens, the tokens being respective instances of respective token types, each of the token types having a value of one aspect of the component information and an indication of an association with one of the elements in the static tree.

22. The computer program as recited in claim 21, the computer program being further operable to build a token data base of the component information from plurality of tokens.

23. The computer program as recited in claim 22, wherein, the computer program is operable to search the token data base for at least one token that refers to the respective element type, for each respective element type in the static tree structure; and is operable to generate the representation of the monitored computer system to have instantiated elements according to the tokens in the token data base.

24. The computer program method as recited in claim 23 wherein a respective element type is instantiated when a realizing token is found in the diagnostic data associated with the respective element type.

25. An apparatus for rebuilding the state of a monitored computer system, comprising:

a first data storage storing a static tree structure representing a general computer system;

a second data storage storing component information indicating hardware and software components of the monitored computer system;

a monitoring computer system, coupled to the first and second data storage, operable to generate a host state of the monitored computer system according to the static tree structure and the component information, and a third data storage coupled to the monitoring computer system, storing each generated host state of the monitored computer system for a predetermined period of time, the third data storage thereby holding a history of host states for the monitored computer system.

26. The apparatus as recited in claim 25 wherein the static tree structure includes element types in a fixed hierarchical relationship, the element types representing the hardware and software components of the monitored computer system.

27. The apparatus as recited in claim 26 wherein the second data storage stores the component information as a plurality of tokens, each token including a value representing one aspect of the component information and an indication of an association with one of the elements in the static tree.

28. The method as recited in claim 27 wherein the plurality of tokens are stored in the form of a hashtable.

29. The apparatus as recited in claim 27 further comprising:

a fourth data storage receiving and storing diagnostic data of the monitored computer system;

a fifth data storage storing token types defining tokens to be found in the diagnostic data, each token being an instantiation of one of the token types; and wherein the monitoring computer system is coupled to the fourth and fifth data storage areas and operable compare the token types to the diagnostic data to extract component information from the diagnostic data.

\* \* \* \* \*